United States Patent
Lempriere

(10) Patent No.: US 6,598,548 B2
(45) Date of Patent: Jul. 29, 2003

(54) SEED METERING DEVICE

(76) Inventor: Noel D. Lempriere, Box 1178, Barriere, British Columbia (CA), V0E 1E0

( * ) Notice: Subject to any disclaimer, the term of this patent is extended or adjusted under 35 U.S.C. 154(b) by 0 days.

(21) Appl. No.: 10/109,107

(22) Filed: Mar. 26, 2002

(65) Prior Publication Data

US 2002/0100401 A1 Aug. 1, 2002

Related U.S. Application Data

(63) Continuation-in-part of application No. PCT/CA00/01123, filed on Sep. 28, 2000.

(51) Int. Cl.$^7$ ............................ A01C 7/00; A01C 9/00
(52) U.S. Cl. .................................... 111/178; 221/211
(58) Field of Search ............................ 111/178, 177, 111/170; 221/211

(56) References Cited

U.S. PATENT DOCUMENTS

| | | | |
|---|---|---|---|
| 3,464,376 A | 9/1969 | Johnson et al. ............... 111/51 |
| 3,620,419 A | 11/1971 | Bailey ........................ 222/298 |
| 3,741,442 A | 6/1973 | Hargreaves et al. ........ 222/142 |
| 4,029,028 A | 6/1977 | Griffiths ....................... 111/86 |
| 4,259,912 A | 4/1981 | Stocks et al. ................ 111/77 |
| 4,264,023 A | 4/1981 | Stocks et al. .............. 222/614 |
| 4,296,695 A | 10/1981 | Quanbeck ..................... 111/34 |
| 4,408,704 A | 10/1983 | Steilen ........................ 222/312 |
| 4,453,866 A | 6/1984 | Ryan .......................... 406/70 |
| 4,480,948 A | 11/1984 | Dreyer ....................... 406/52 |
| 4,741,428 A | 5/1988 | Taniguchi et al. .......... 198/397 |
| 4,757,918 A | 7/1988 | Ottewell ..................... 221/139 |
| 4,793,523 A | 12/1988 | Bailey et al. .............. 222/288 |
| 4,834,004 A | 5/1989 | Butuk et al. ............... 111/200 |
| 4,928,858 A | 5/1990 | Tite ............................ 222/312 |
| 5,549,060 A | 8/1996 | Schick et al. .............. 111/178 |
| 5,845,818 A | 12/1998 | Gregor et al. ............. 222/273 |
| 5,855,303 A | 1/1999 | Gregor ....................... 222/368 |
| 5,924,370 A | 7/1999 | Gregor et al. ............. 111/174 |

FOREIGN PATENT DOCUMENTS

| | | | |
|---|---|---|---|
| CA | 1036869 | 8/1978 | .................. 111/39 |
| CA | 1274726 | 10/1990 | .................. 111/34 |
| CA | 2242115 | 2/1999 | |
| EP | 0094583 | * 8/1985 | |
| EP | 0626127 A1 | * 11/1994 | |
| GB | 2 144 013 A | 2/1985 | |
| GB | 2163334 A | 2/1986 | |
| WO | WO 92/12619 | 8/1992 | |

* cited by examiner

Primary Examiner—Christopher J. Novosad
(74) Attorney, Agent, or Firm—Chernoff, Vilhauer, McClung & Stenzel, LLP

(57) ABSTRACT

A seed metering device includes a roller nip for mounting beneath a seed reservoir. The nip is formed by first and second opposed facing nip forming surfaces mounted beneath, and aligned with, the reservoir wherein the first nip forming surface is a radially-outer surface of a soft resilient roller. The roller is rotatable by a roller drive in a first rotational direction so as to draw down through the nip, by frictional engagement of the seeds in the nip with the surface of the resilient roller, seeds falling into the nip. The nip is an elongate, curved, thin wedge-shaped nip providing an increased dwell time for seeds being compressed in the nip.

20 Claims, 33 Drawing Sheets

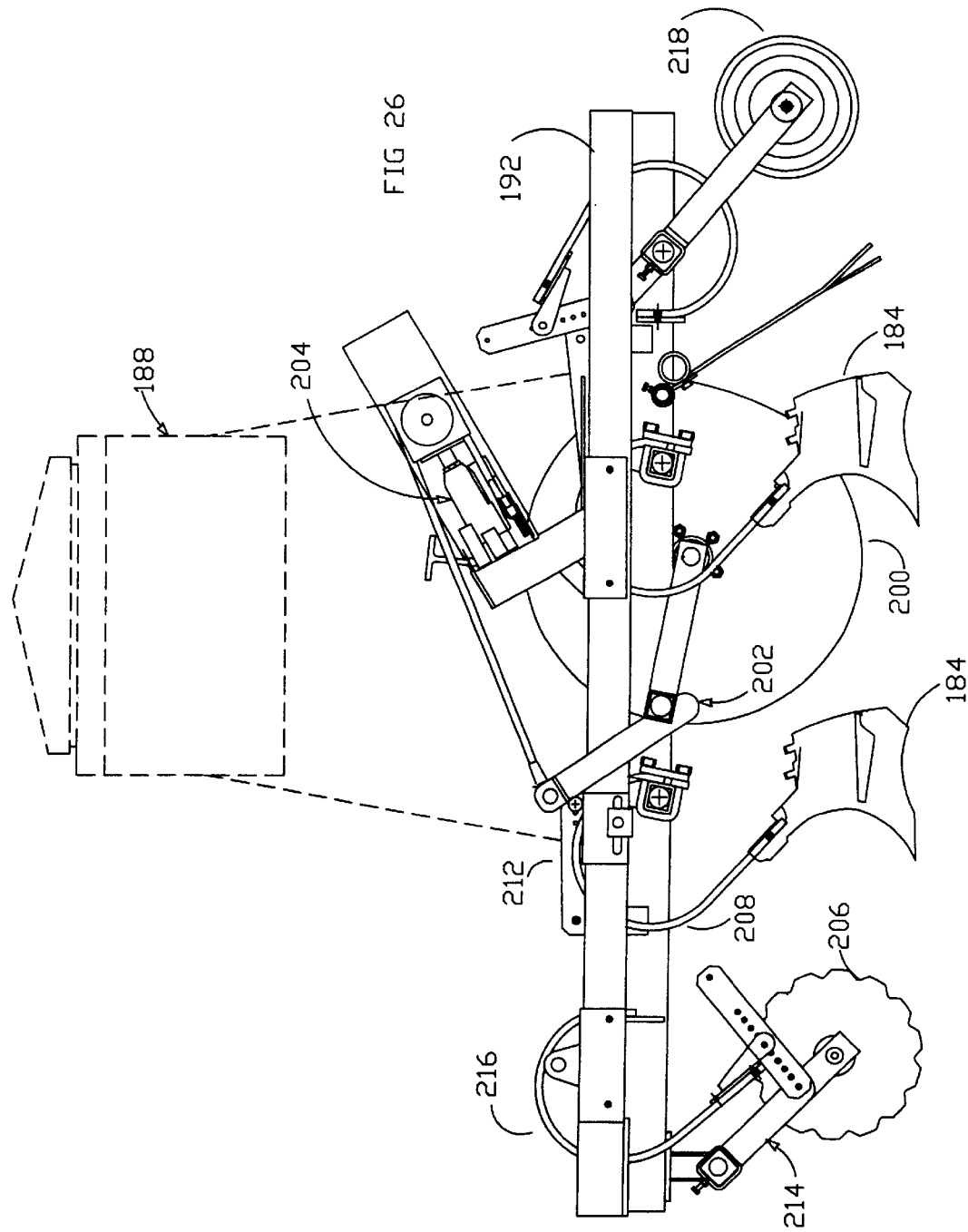

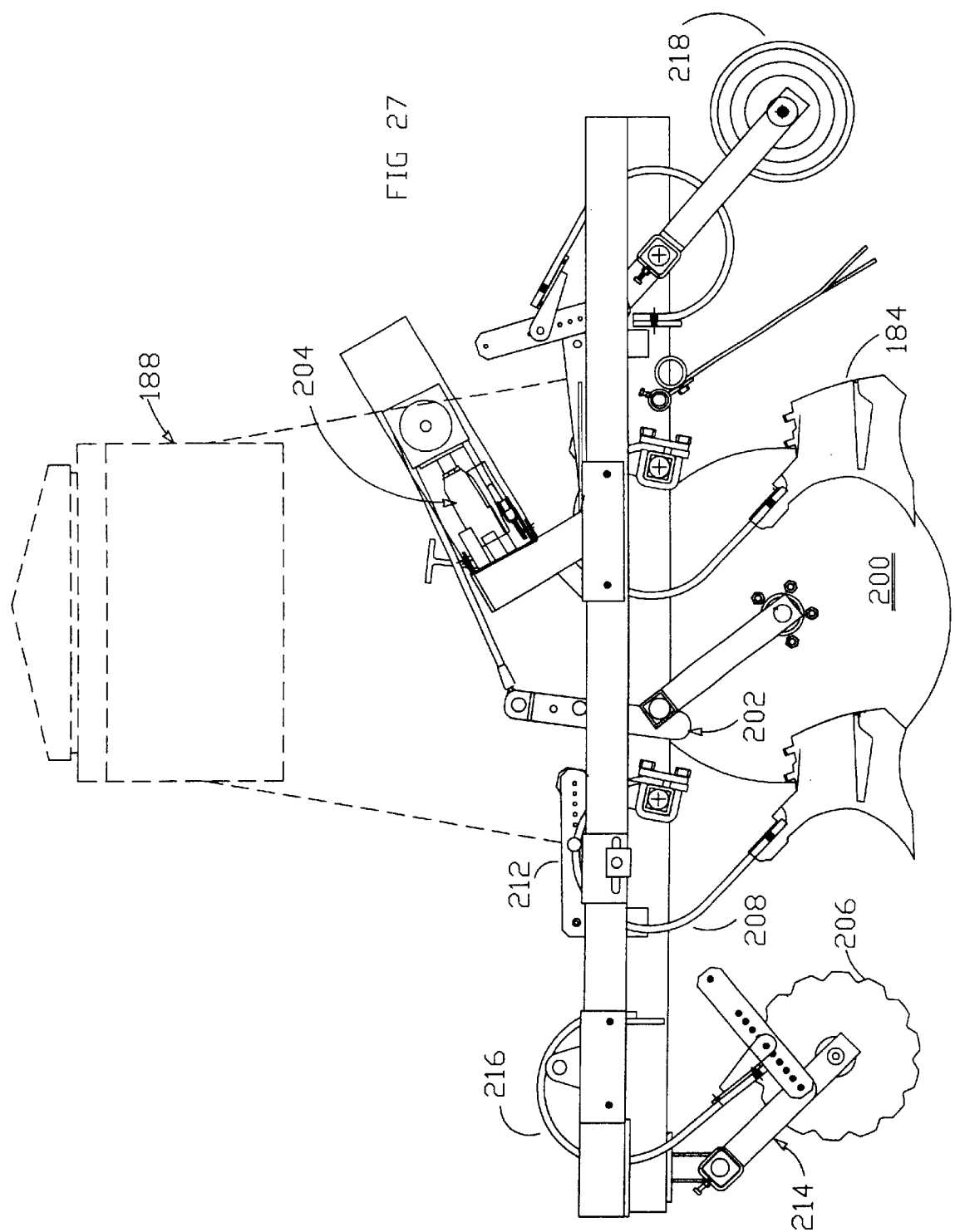

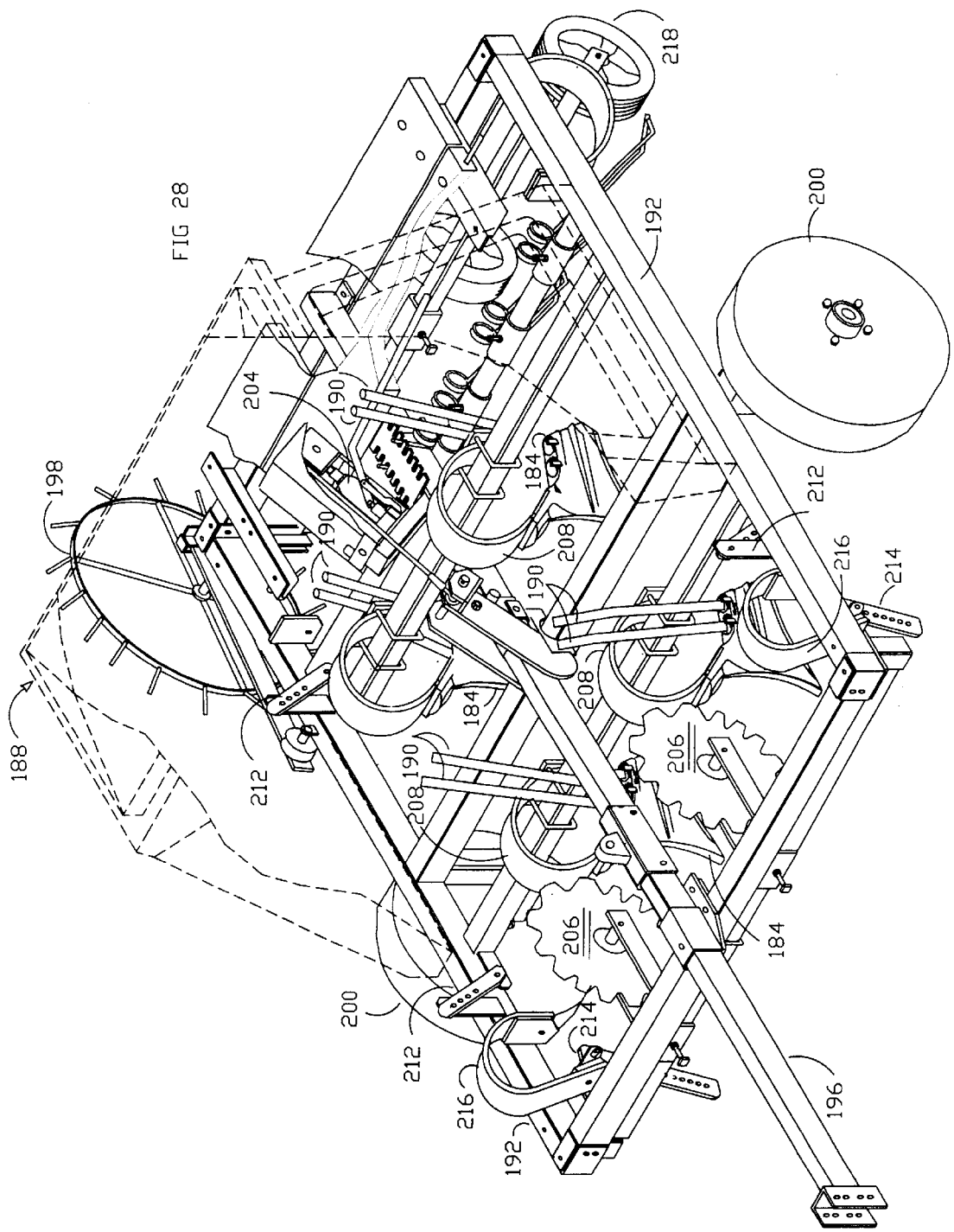

SEED METERING DEVICE

CROSS REFERENCE TO RELATED APPLICATION

This application is a Continuation-In-Part of International Application No. PCT/CA00/01123, entitled Seed Metering Device, with an International filing date of Sep. 28, 2000, which has not yet been published under PCT Article 21(2).

FIELD OF THE INVENTION

This invention relates to the field of devices for metering agricultural seed from a seed hopper.

BACKGROUND OF THE INVENTION

In the prior art, Canadian Patent No. 1,036,869 which issued Aug. 22, 1978 to Stocks for a Means For Metering Particulate Material teaches that it is known to provide a hopper mounted on a wheeled support where the floor of the hopper defines an exit closed by counter-rotatable rollers. Each of the rollers is covered with a layer of compressible material so as to provide a resilient nip between the rollers through which seed may be discharged from the hopper at a controlled rate. The device of Stocks discloses the use of a single neoprene covered roller forming a short nip between the roller and a glass metering plate, attached to the hopper, which bears against the roller. The metering plate may be mounted to the hopper by a hinge so as to allow adjustment of the position of the plate relative to the roller so as to vary the pressure of the plate bearing against the roller.

As with other conventional or prior art seed dispensers which rely on a roller or pair of rollers disposed beneath an opening in the floor of a bin, Stocks discloses allowing the seed to fall through the hole in the floor of the bin so as to accumulate in the nip a reservoir of seeds waiting to be fed through the nip by the rotation of the roller. The seed flow rate is regulated by the speed of rotation of the roller. What occurs in the prior art is that the seeds which flow into the nip may bunch or jam so that the flow rate of the seeds through the roller is not uniform.

SUMMARY OF THE INVENTION

The seed metering device of the present invention includes a roller nip beneath a seed reservoir such as a bin or hopper. The reservoir has a first aperture in a floor of the reservoir. The nip is formed by first and second opposed facing nip forming surfaces mounted beneath the first aperture so that seeds fall through the first aperture into the nip. The first nip forming surface is a radially-outer surface of a resilient roller. The second nip forming surface is a rigid control surface of a lower wall. The roller is rotatable by a roller drive in a first rotational direction so as to draw seeds down through the nip, by frictional engagement of the seeds in the nip with the surface of the resilient roller so as to slide or roll the seeds along the control surface and through the nip. The roller may be made entirely of resilient foam such as polyurethane foam. The roller surface may be either smooth or scalloped or notched transversely, for example to accommodate larger seeds. The roller drive is driven by a drive means such as a stepper motor, ground drive or other rotational drive for example acting through gearing such as reduction gearing.

An apertured slide may be slidably mounted adjacent the floor of the reservoir. The slide has a second aperture. The slide is slidably positionable into a position between an open position, wherein the second aperture is aligned with the first aperture to allow a flow of seeds from the reservoir into the nip, and a closed position wherein the second aperture is offset from the first aperture so as to block the first aperture with a seed-impervious portion of the slide.

The floor is preferably rigid and the slide may be mounted between the floor and the nip. The slide and the floor may be generally planar although this is not intended to be limiting.

In one embodiment, where restricted seed flow into the nip is desired, the second nip forming surface includes a rigid nozzle surface of a restrictor plate removably mounted beneath or in the first aperture, in which case the rigid nozzle surface may be a lower surface of a converging nozzle conduit extending through the restrictor plate so as to extend beneath the first aperture. Advantageously the restrictor plate has a curved lower surface flush with a portion of the surface of the roller and the nozzle conduit terminates in an aperture in the curved lower surface. The nozzle conduit and its corresponding aperture form a short secondary nip through which the seeds are drawn before falling into a primary nip.

In an embodiment where a greater seed flow rate is desired, the restrictor plate is removed allowing seeds to fall into the primary nip directly. The primary nip is a wedge-shaped elongate curved nip formed by the mounting of the roller in eccentric relation to a constant radius section of a lower wall of the roller housing, or otherwise forming the lower wall of the roller housing so that the primary nip extends in a curved gradually converging wedge over at least a 60 degree radiussed arc along the inner surface of the lower wall of the roller housing between generally the position of the secondary nip on the lower wall and a generally vertically aligned position on the lower wall, vertically aligned beneath the center of curvature of the lower wall, where the roller contacts the lower wall of the roller housing. In one embodiment the lower surface of the vertex of the wedge-shaped primary nip is a short flat substantially horizontal planar section or member for example formed by the use of a spreader plate. The spreader plate may have a downstream-most rolled rim-like lip providing a rounded edge as the exit surface downstream from the vertex.

In applicant's experience, the elongate curved seed flow trajectory of seeds being drawn through the primary nip by rotation of the roller, under the softly resilient urging of the seeds against the lower wall of the roller housing by the resilient roller, tends to sort the seeds into a single seed thickness layer feeding into and through the vertex of the wedge-shaped primary nip without bunching, jamming or double-stacking of seeds, i.e. without being left as a double thickness seed layer in the nip. The use of the downstream spreader plate provides for a generally uniform "water-fall"-like dispersion of seeds across the width of the spreader plate so as to result in an even curtain of falling seeds being metered from the vertex of the nip.

The roller may be mounted on a drive shaft of the roller drive. The roller may be sandwiched between a pair of rigid discs mounted one on each opposite side of the roller so as to leave the radially-outer surface of the roller exposed for rotation through the nip. In this embodiment, the pair of rigid discs are rigidly mounted on the drive shaft. The discs may be mounted to the roller by adhesive or otherwise so that rotation of the pair of rigid discs on the drive shaft simultaneously rotates the roller.

A pair of rigid walls may be mounted below the floor of the reservoir, generally orthogonal to the floor. The pair of walls may have apertures so that the drive shaft may be journalled through the apertures. The pair of walls sandwich the pair of rigid discs and the roller. In one embodiment each wall of the pair of walls has arcuate fairleads which form disc supports for sliding rotational mating of the pair of rigid discs in the disc supports.

In one aspect of the present invention, the roller may be one of a parallel array of rollers, the array of rollers extending the length of the first aperture.

BRIEF DESCRIPTION OF THE DRAWINGS

FIG. 18b is, in perspective view, the side opposite view to that of FIG. 18a.

FIG. 20 is, in perspective partially cut away view, the non-drive end of FIG. 18a.

FIG. 21 is, in perspective view, a flow restrictor such as seen mounted in FIG. 18a.

FIG. 26 is a further side elevation cross sectional view showing the frame supporting wheel and its actuating mechanism, with the wheel in its raised position.

FIG. 27 is the view of FIG. 26 with the frame supporting wheel in its lowered position.

FIG. 28 is, in partially cut away perspective view, the supporting frame, opening blades, and frame supporting wheels of FIGS. 25–27.

DETAILED DESCRIPTION OF EMBODIMENTS OF THE INVENTION

Figure 1:
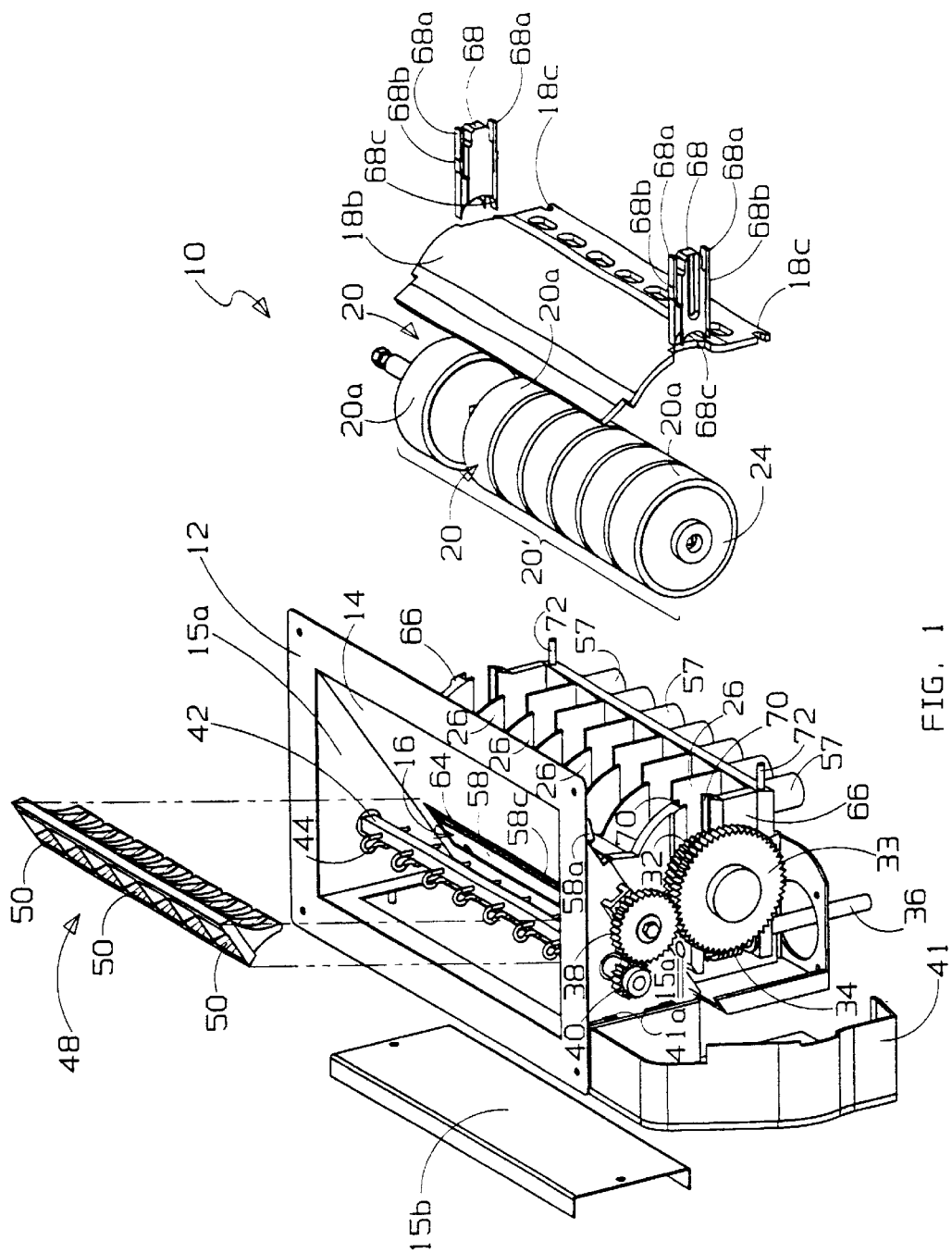
FIG. 1 is, in partially exploded left side perspective view, the seed metering device of the present invention.
Figure 2:
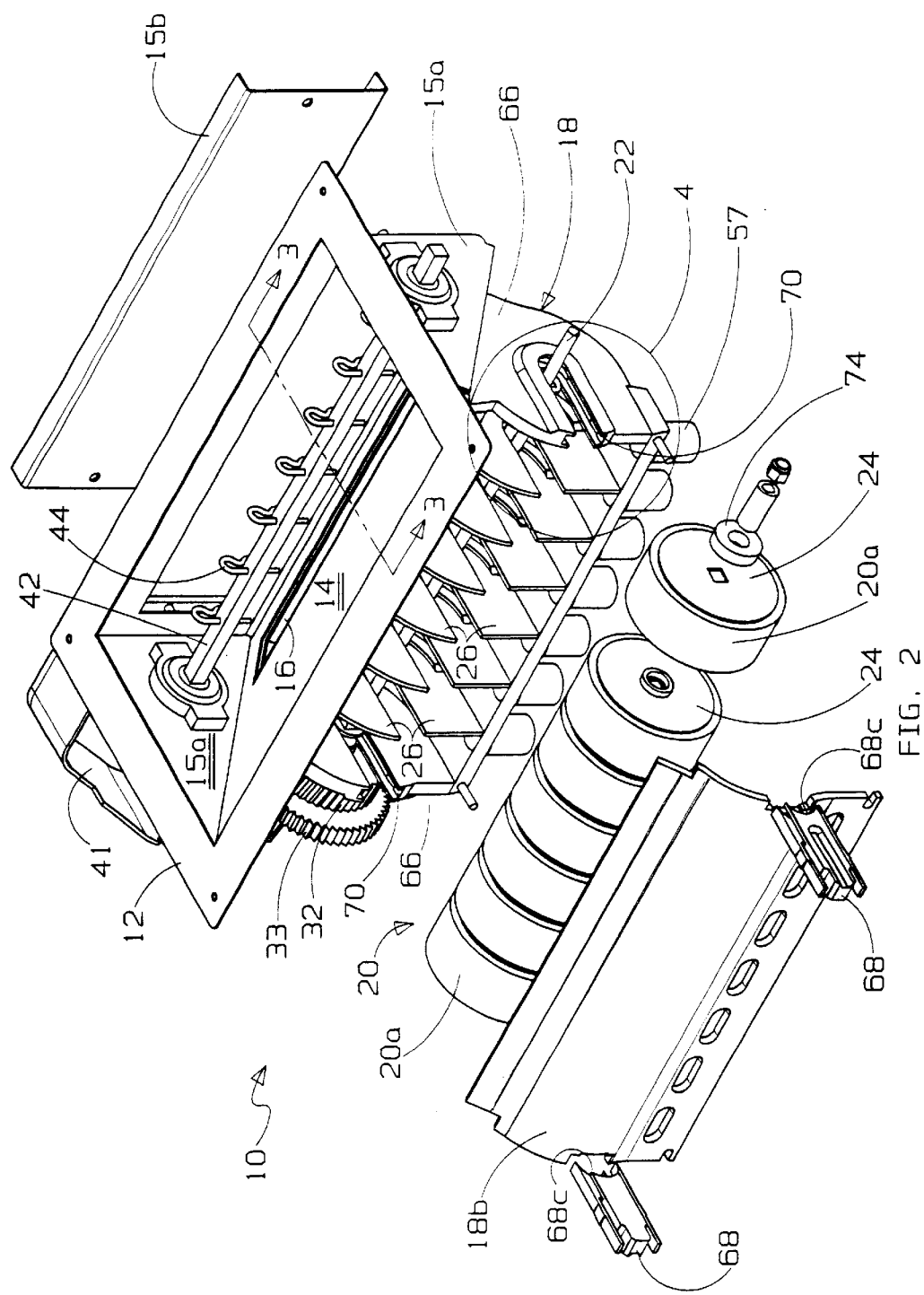
FIG. 2 is, in partially exploded right side perspective view, the seed metering device of FIG. 1.

As seen in FIGS. 1 and 2, the seed metering device 10 of the present invention includes a hopper or bin 12 having an inclined floor 14. Hopper 12 has oppositely disposed side walls 15a and a rear wall 15b. The rear wall is mounted to hopper 12 by means of bolts or studs 15c. A rectangular aperture 16 is formed in the lower end of floor 14.

Figure 3:
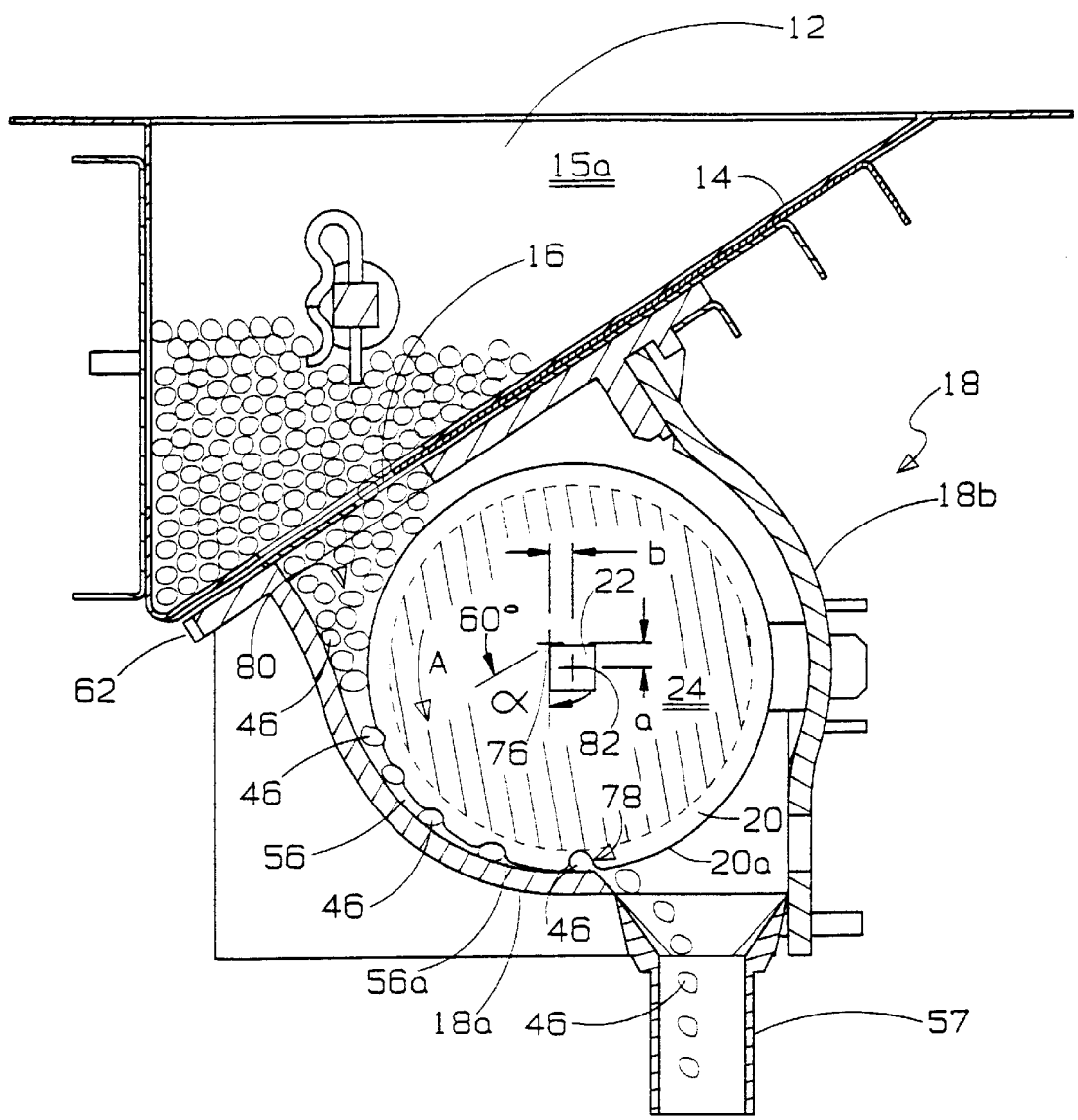
FIG. 3 is a sectional view along line 3—3 in FIG. 2.

A roller housing 18 is mounted beneath floor 14. As seen in FIG. 3, roller housing 18 has a lower wall or rigid control surface 18a and a generally oppositely disposed upper wall or cover 18b. An array 20' of shaft mounted rollers 20 are mounted on shaft 22 within housing 18. Advantageously, array 20' is a parallel, closely spaced array of soft resilient polyurethane foam rollers 20, for example made from 40 pound, No. 3, expanded foam, although this is not intended to be limiting. Each roller may be made entirely of foam and in which case is supported by a pair of rigid discs 24 adhesively mounted on either side of the roller so as to support the side walls of the roller. Array 20' is maintained as a closely spaced array by dividing walls 26. Dividing walls 26 are rigidly mounted within roller housing 18, and are spaced apart at regular intervals along shaft 22.

Figure 4:
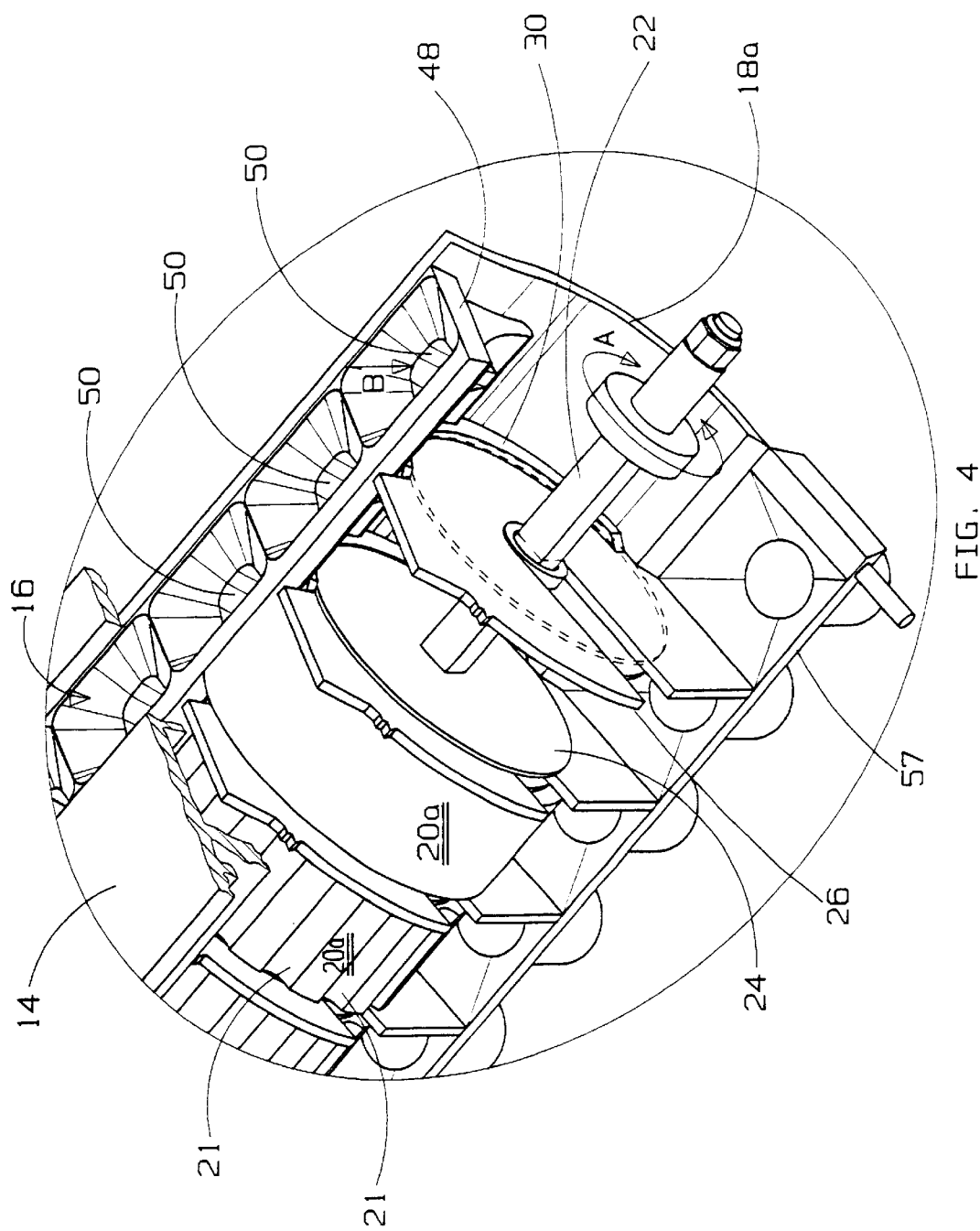
FIG. 4 is an enlarged view of a portion of FIG. 2.
Figure 5:
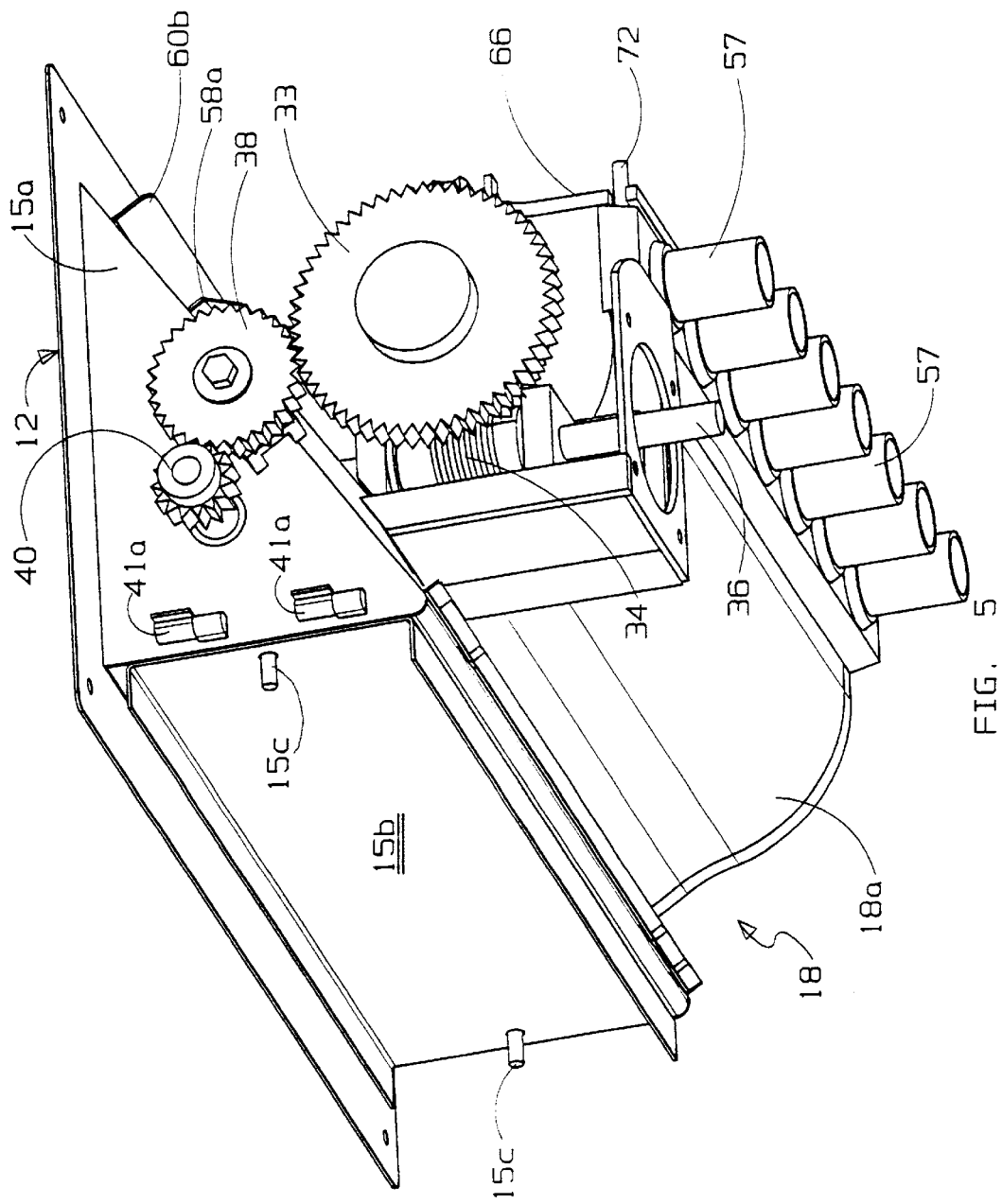
FIG. 5 is, in left side perspective view, the assembled seed metering device of FIG. 1 with the gear cover removed.
Figure 6:
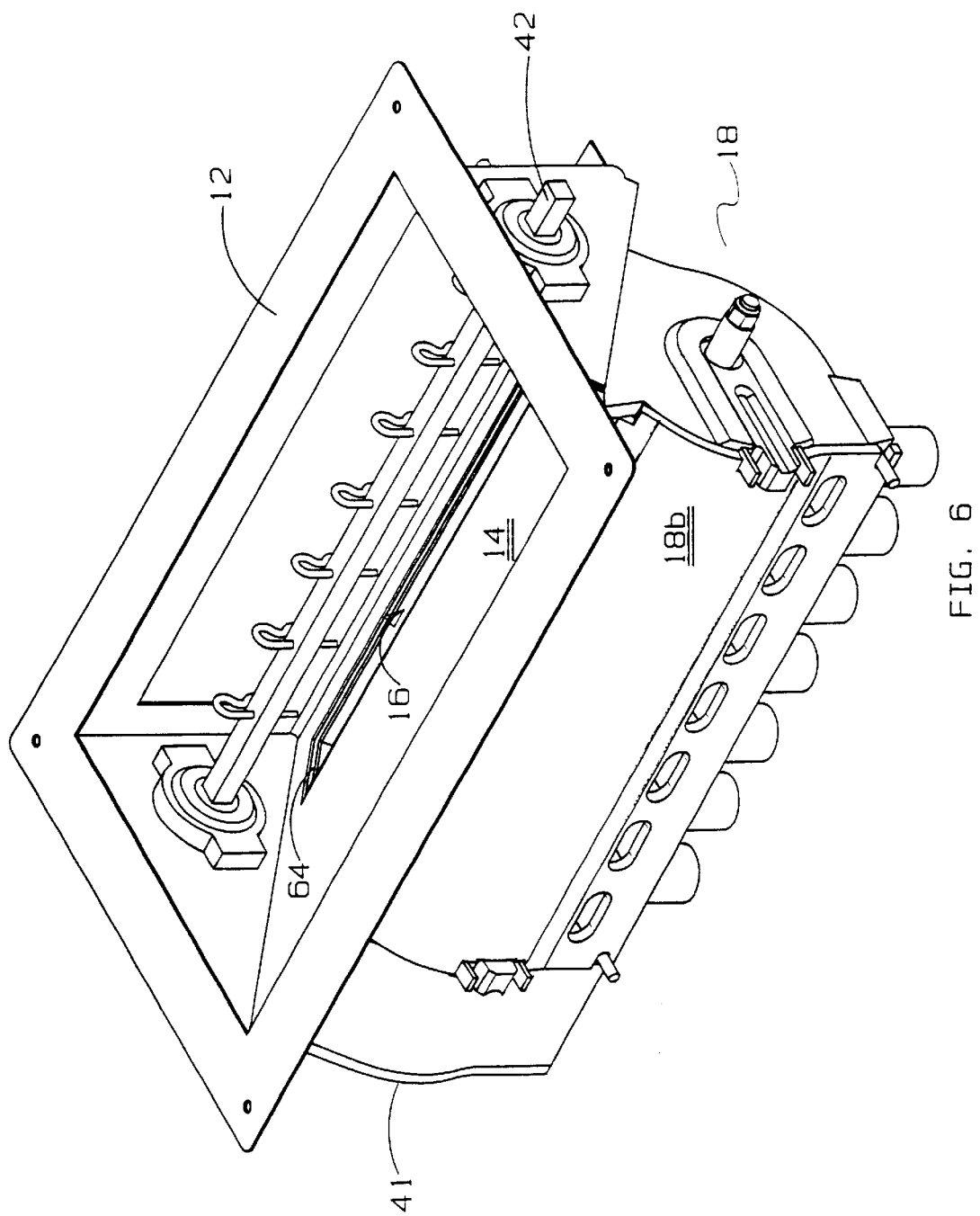
FIG. 6 is, in right side perspective view, the assembled seed metering device of FIG. 2.

Shaft 22 is rotatably mounted through notches 28 formed in each of dividing walls 26, as better seen in FIG. 4. Shaft 22 is square in cross-section for mating with corresponding square, centered holes in discs 24. When rollers 20 are mounted onto shaft 22, the discs 24 on either side of each roller seat into correspondingly circularly-shaped fairleads 30 formed on either side of each of dividing walls 26. Dividing walls 26 are spaced a sufficient distance apart so as to snugly sandwich each roller 20 between its corresponding discs 24. Thus, with rollers 20 and discs 24 mounted onto shaft 22 so as to seat disc 24 in fairleads 30, rotating shaft 22 rotates discs 24 thereby rotating rollers 20 simultaneously.

In this embodiment, not intended to be limiting, shaft 22 is driven by drive gear 32, auxiliary gear 33 is rigidly co-axially mounted to drive gear 32, and worm gear 34 mounted on drive shaft 36 mates with drive gear 32 so that rotation of drive shaft 36 thereby rotates drive gear 32. Drive gear 32 is mounted onto shaft 22 so that rotation of drive shaft 36 by a motor (not shown in this embodiment, and better described below) or other drive means rotates rollers 20 in direction A.

Again without intending to be limiting, in this embodiment idler gear 38 is rotatably mounted to the outer side wall of hopper 12 so as to mate between drive gear 33 and drive sprocket 40, and drive sprocket 40 mounted onto one end of agitator shaft 42 so that rotation of drive shaft 36 rotates agitator shaft 42 simultaneously with rotation of shaft 22. Gears 32, 33, 34 and 38, and sprocket 40 are protected within housing 41. Housing 41 may be pivotally mounted to side wall 15a by means of hinges 41a.

Pins 44 or other agitator arms are mounted onto agitator shaft 42 so that, when hopper 12 contains seeds 46, rotation of agitator shaft 42 mixes and agitates seeds 46 to assist in a smooth flow of seeds 46 through aperture 16.

Figure 1A:
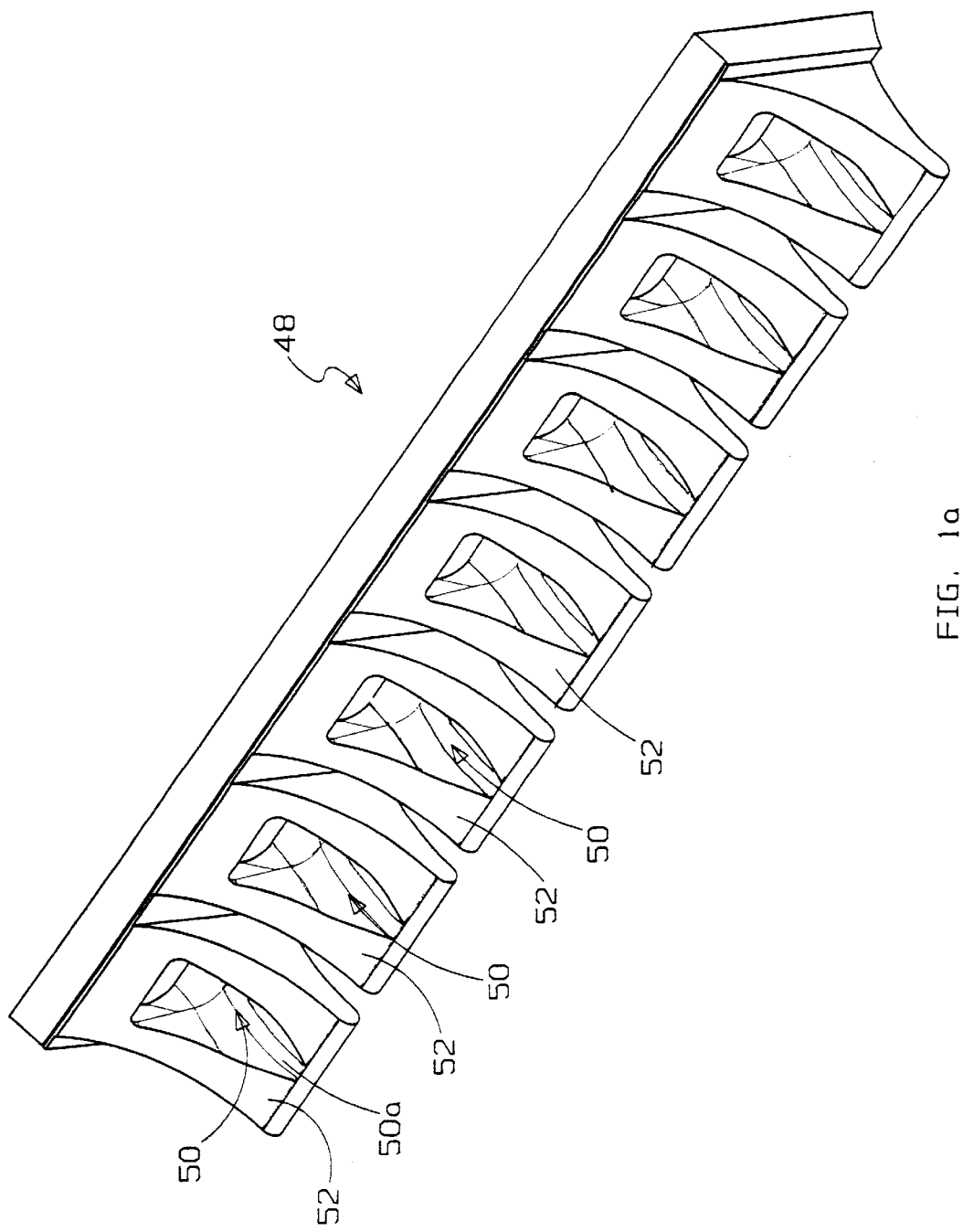
FIG. 1a is, in enlarged perspective view, the nozzle bar of the seed metering device of FIG. 1.

Restrictor plate 48, better seen in FIG. 1a, may be mounted below aperture 16 in roller housing 18 so as to align nozzles 50 in restrictor plate 48 beneath aperture 16. With restrictor plate 48 so installed, lower curved faces 52 are flush with correspondingly aligned outermost surfaces 20a of rollers 20 when mounted on shaft 22. Seeds 46 flowing through aperture 16 thus flow in direction B through nozzles 50 into the upper nip 54 formed between outer surfaces 20a of rollers 20 and the lower opening of nozzles 50 in lower curved faces 52.

Figure 3A:
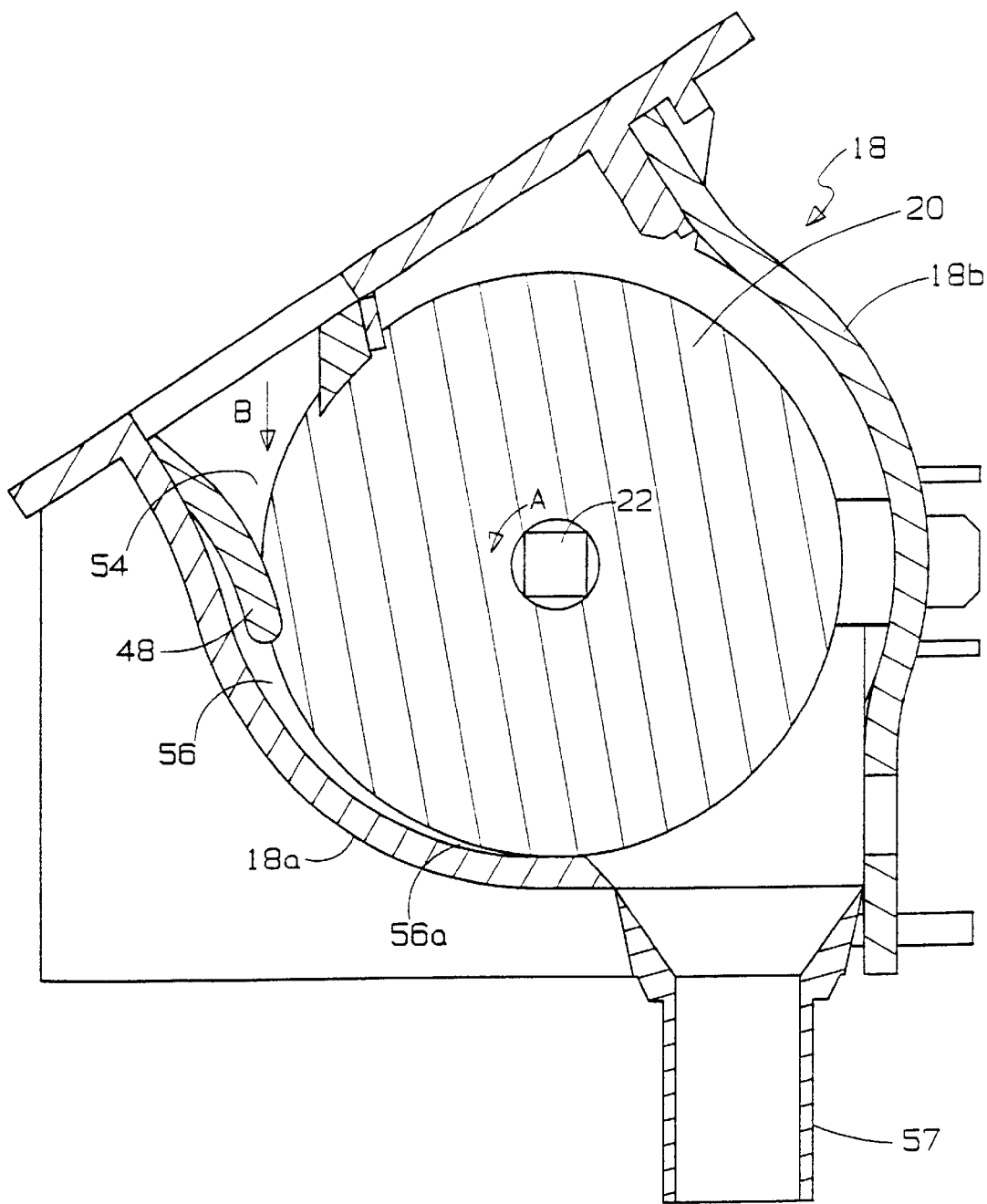
FIG. 3a is, in partially cut-away view, the roller and roller housing of FIG. 3.
Figure 3B:
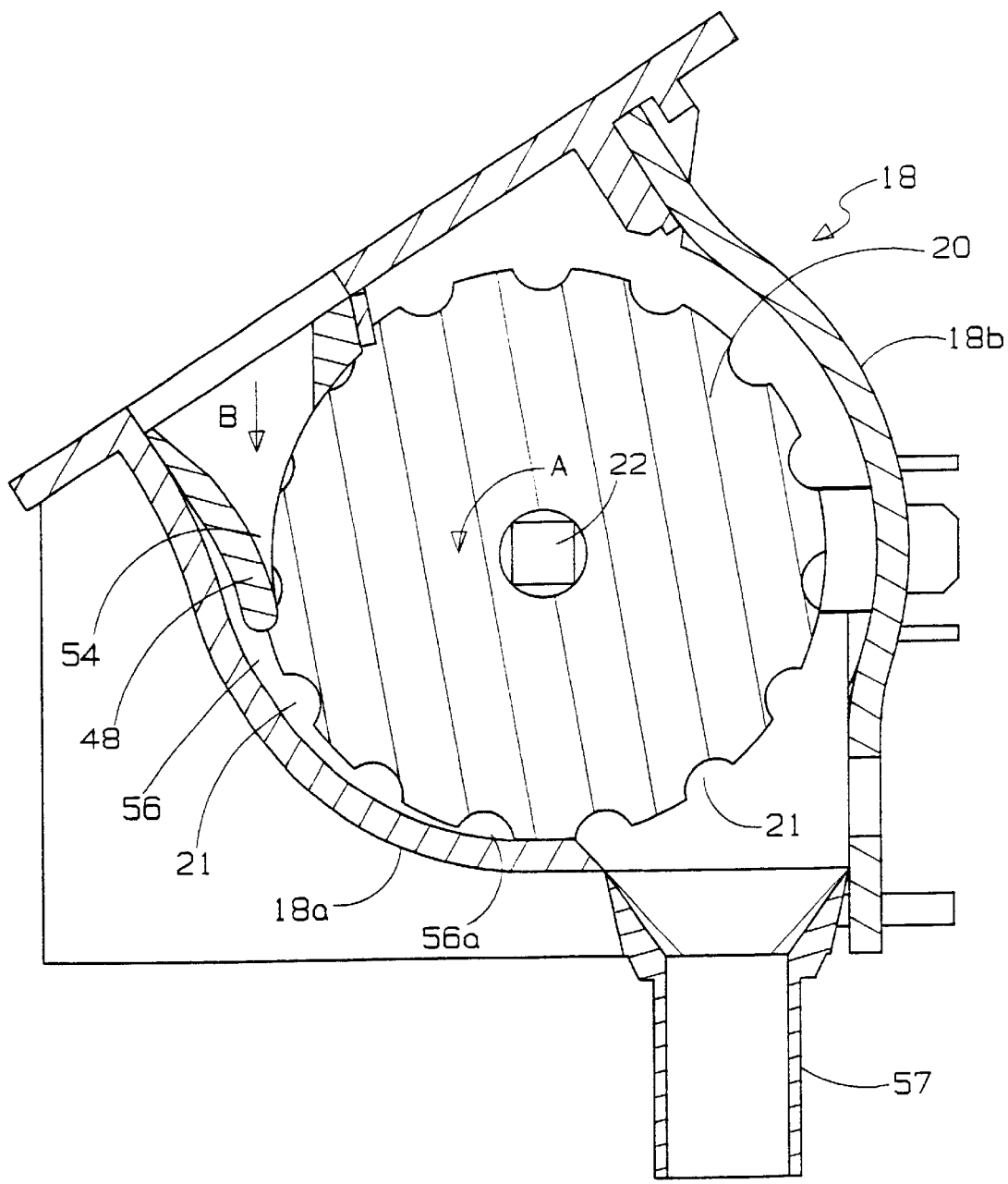
FIG. 3b is, in partially cut-away view, the roller housing of FIG. 3 showing a notched roller.

As better seen in FIGS. 3a, 3b and 4, the outer surfaces 20a are substantially cylindrical and may be smooth surfaced, or scalloped, or have lateral notches 21 therearound in equally radially spaced array. Both the smooth and notched types of rollers are shown in FIG. 4 although it is understood that generally one or the other would normally be used at one time. Seeds 46 in upper nip 54 are sandwiched between the interior surfaces 50a of nozzles 50, and the profile or lower curved faces 52 followed by outer surfaces 20a of rollers 20. Rotation of rollers 20 in direction A pulls the flow of seeds 46 in direction B past upper nip 54 into the lower or primary nips 56 formed between rollers 20 and the interior surface of lower wall 18a of roller housing 18. Rollers 20 are rotated in direction A at a rotational speed governed by the desired seed flow rate. The seed flow rate is advantageously ground speed sensitive. That is, the speed controller (not shown) governing the rotational speed of shaft 22, for example by controlling the rotation speed of drive shaft 36, knows the seed spread density selected by the user, and adjusts the seed flow rate to match the desired density of seeds sown into the ground by increasing the seed flow rate when the spread is translating over the ground at a higher velocity, that is, at a higher ground speed, and vice versa. This is accomplished by a processor controlling, in one embodiment, a variable speed drive which may be electric, mechanical, hydraulic or a combination of these, and in another embodiment a stepper motor as discussed below. Once seeds 46 leave primary nips 56 they flow under the force of gravity through correspondingly aligned chutes 56a.

As better seen in FIGS. 5–8, shut off of the flow of seeds 46 in direction B into nip 54 is accomplished in one embodiment by the use of an apertured slide 58. Apertured slide 58 extends the length of aperture 16. Aperture slide 58 may be slid in direction C, its range of motion governed by movement of flange 58a on slide 58 between a lower stop 60a and an upper stop 60b. Apertured slide 58 is slidably mounted in channels between floor 14 and the base 62 of roller housing 18, that is, where roller housing 18 mounts to hopper 12. In particular, the opposite longitudinal ends of apertured slide 58 corresponding to the opposite longitudinal ends of aperture 16 are slidably mounted in opposed facing channels 64, better seen in FIG. 6, formed between floor 14 and base 62.

Figure 7:
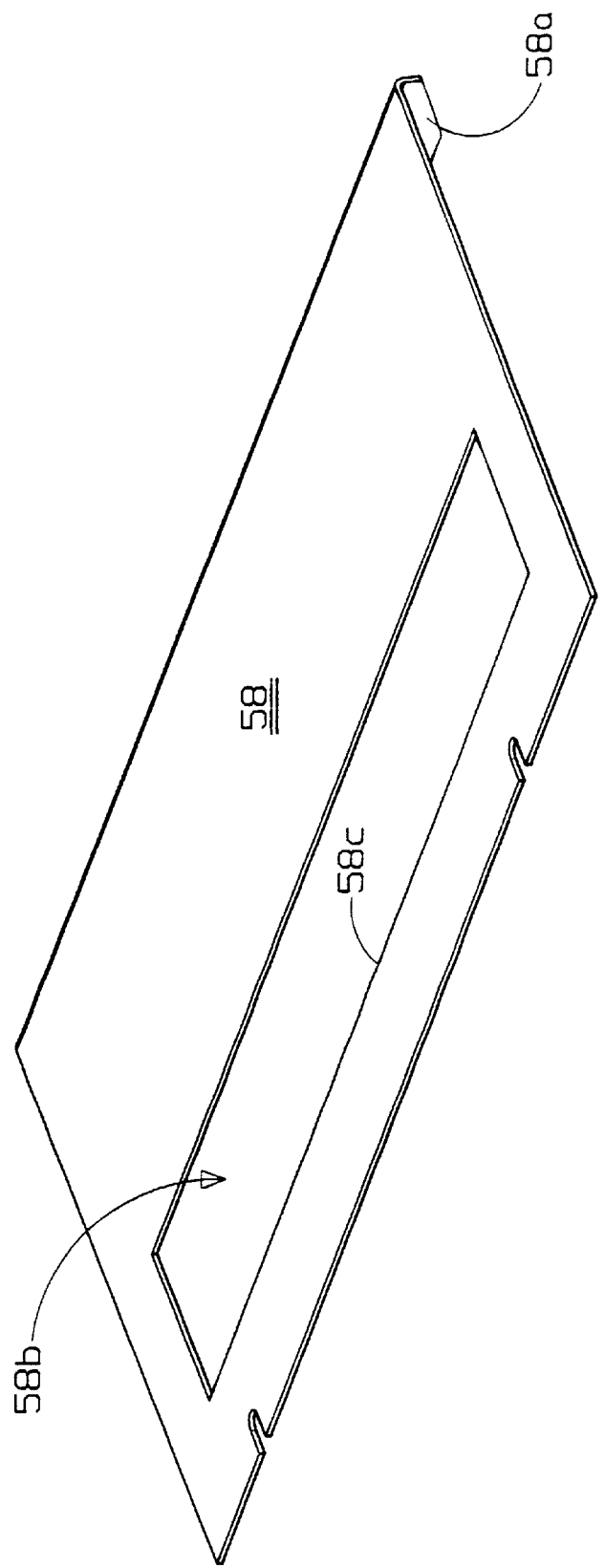
FIG. 7 is, in perspective view, the apertured slide of the seeding metering device of the present invention.
Figure 8:
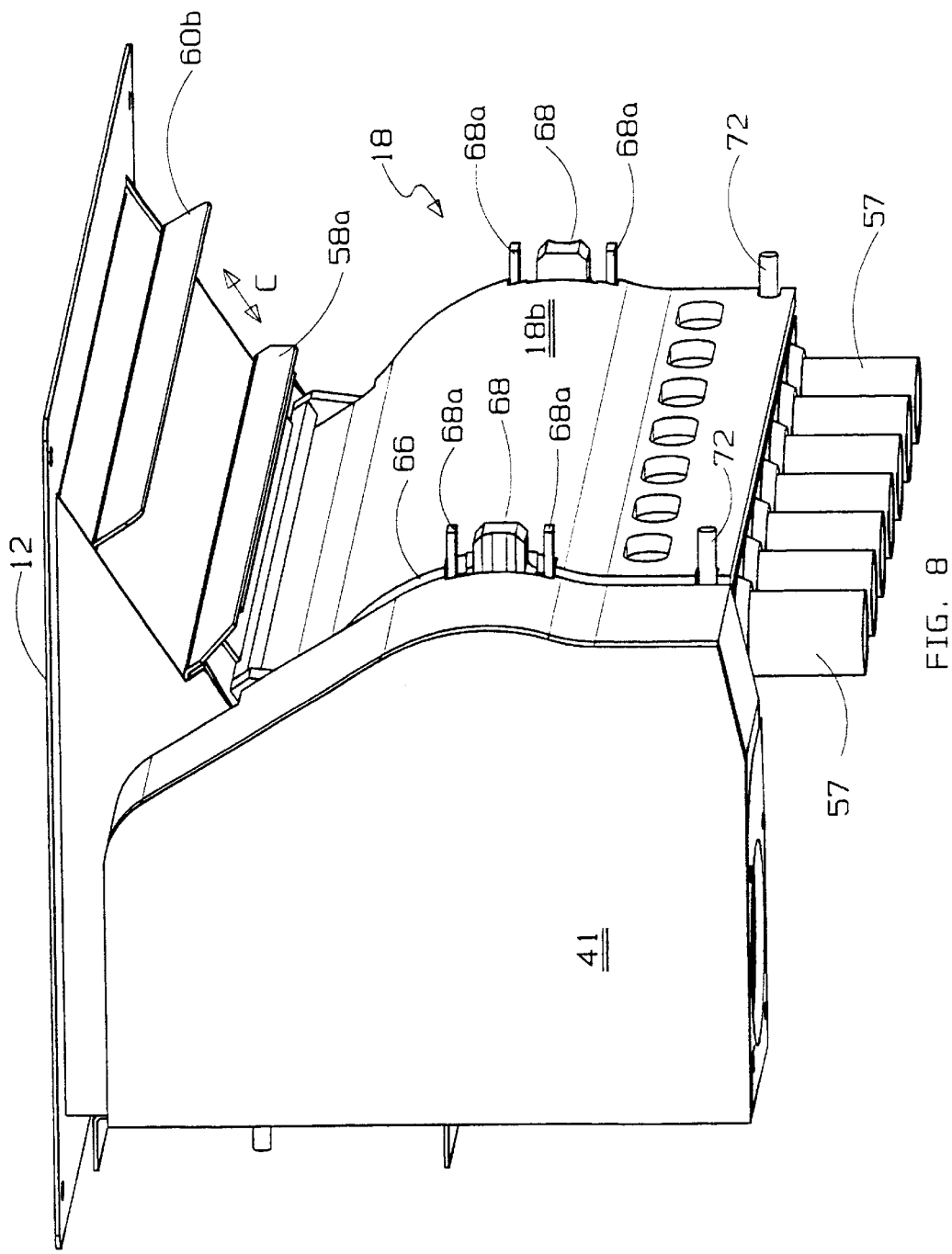
FIG. 8 is, in left side perspective view, the seed metering device of FIG. 5 with the gear cover mounted so as to enclose the drive gears and showing the slide operation of the apertured slide of FIG. 7.
Figure 9:
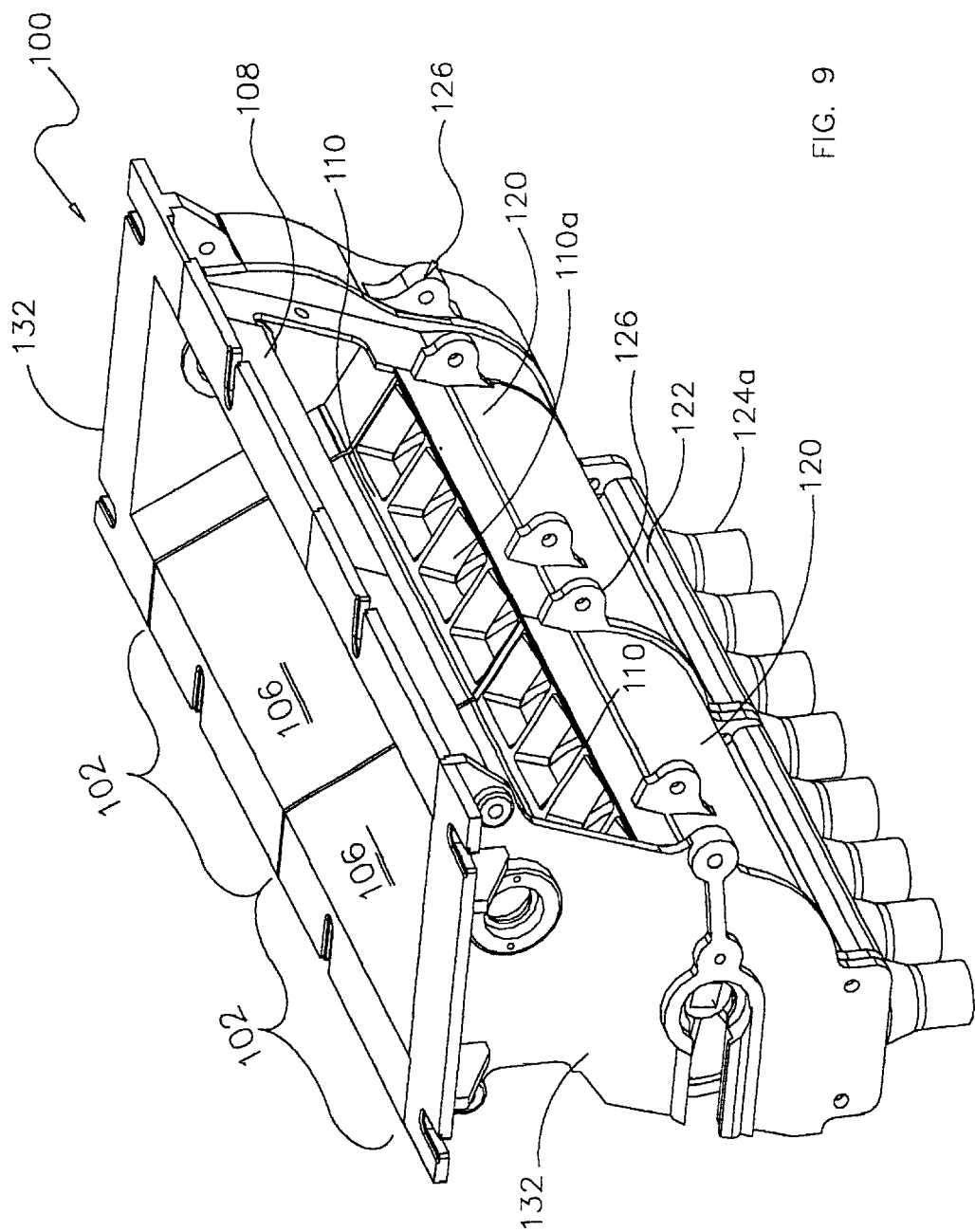
FIG. 9 is, a perspective view of a first side of a two-module embodiment of the seed metering device of the present invention.
Figure 10:
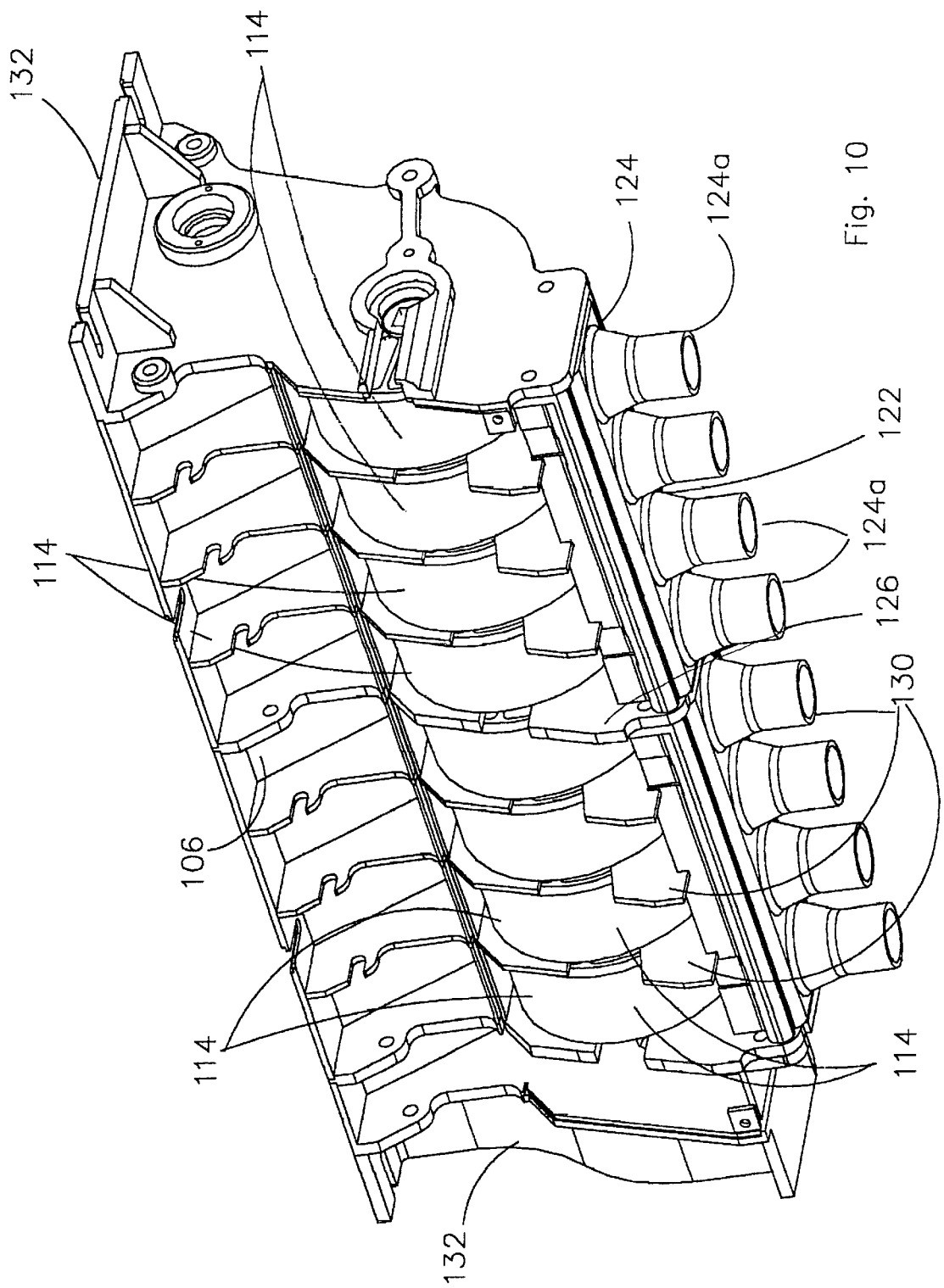
FIG. 10 is a perspective view of a second and opposite side of the seed metering device of FIG. 9.
Figure 11:
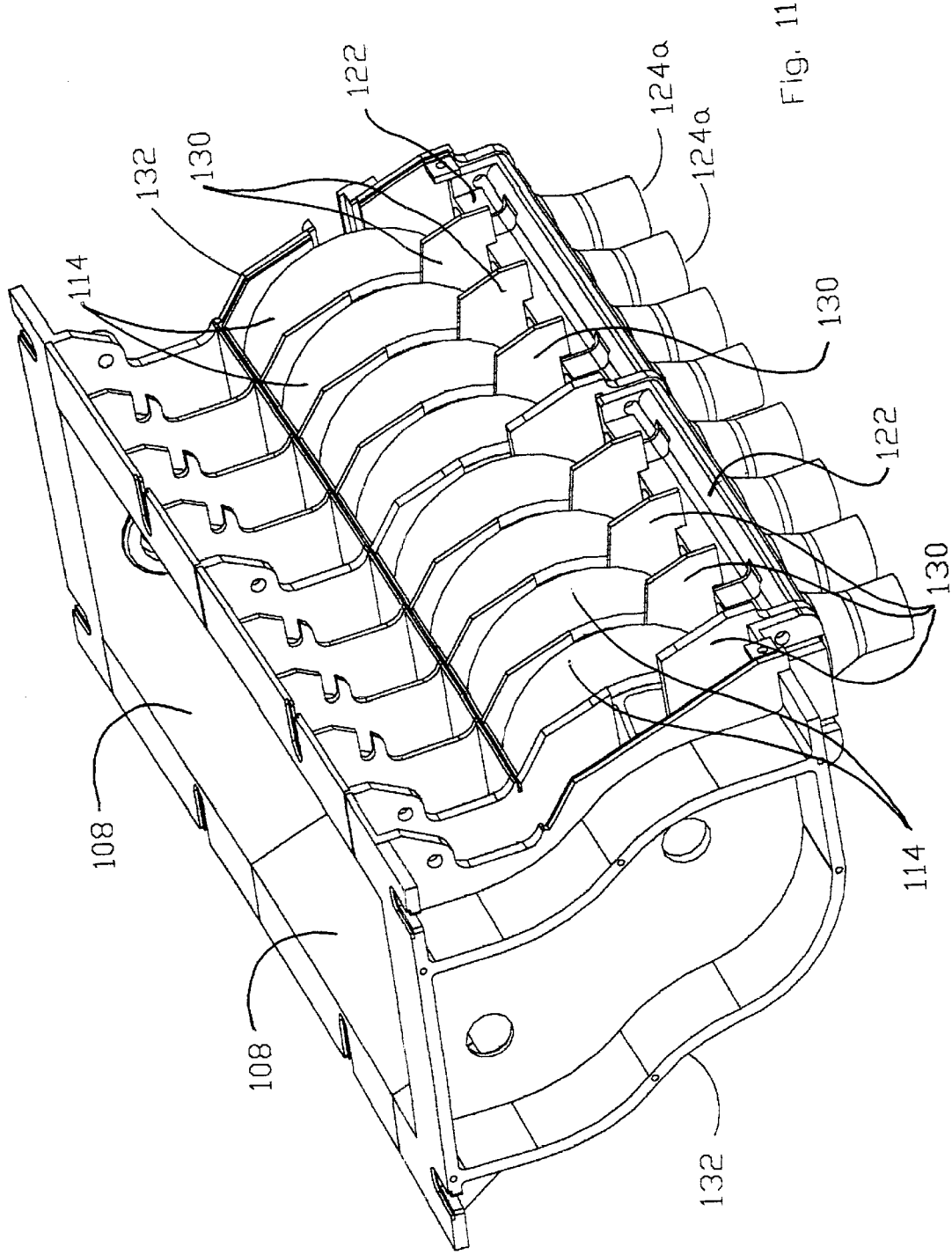
FIG. 11 is a perspective view of the seed metering device of FIG. 10 viewed from the opposite end.
Figure 12:
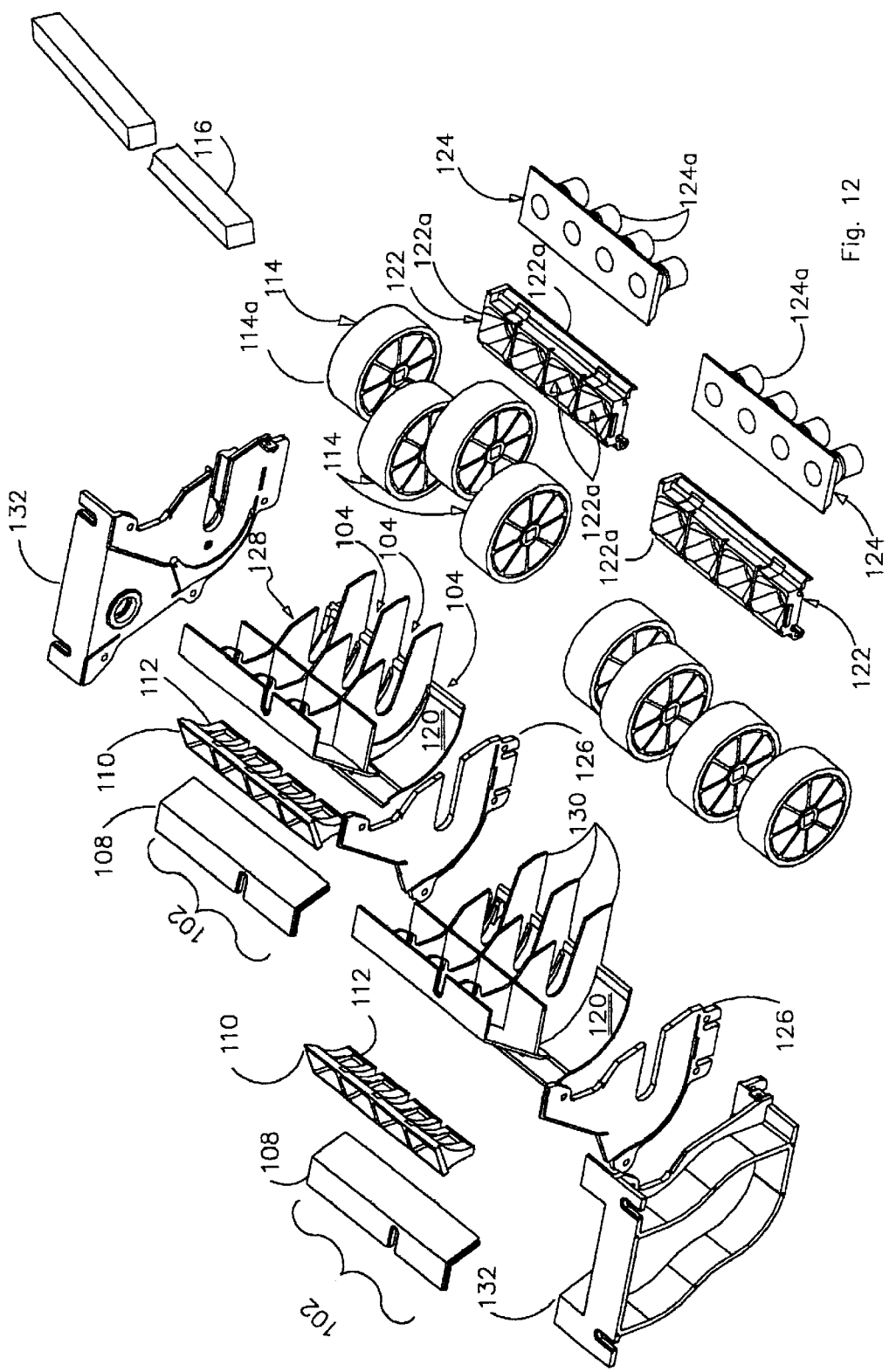
FIG. 12 is, in exploded view, the seed metering device of FIG. 11.
Figure 13:
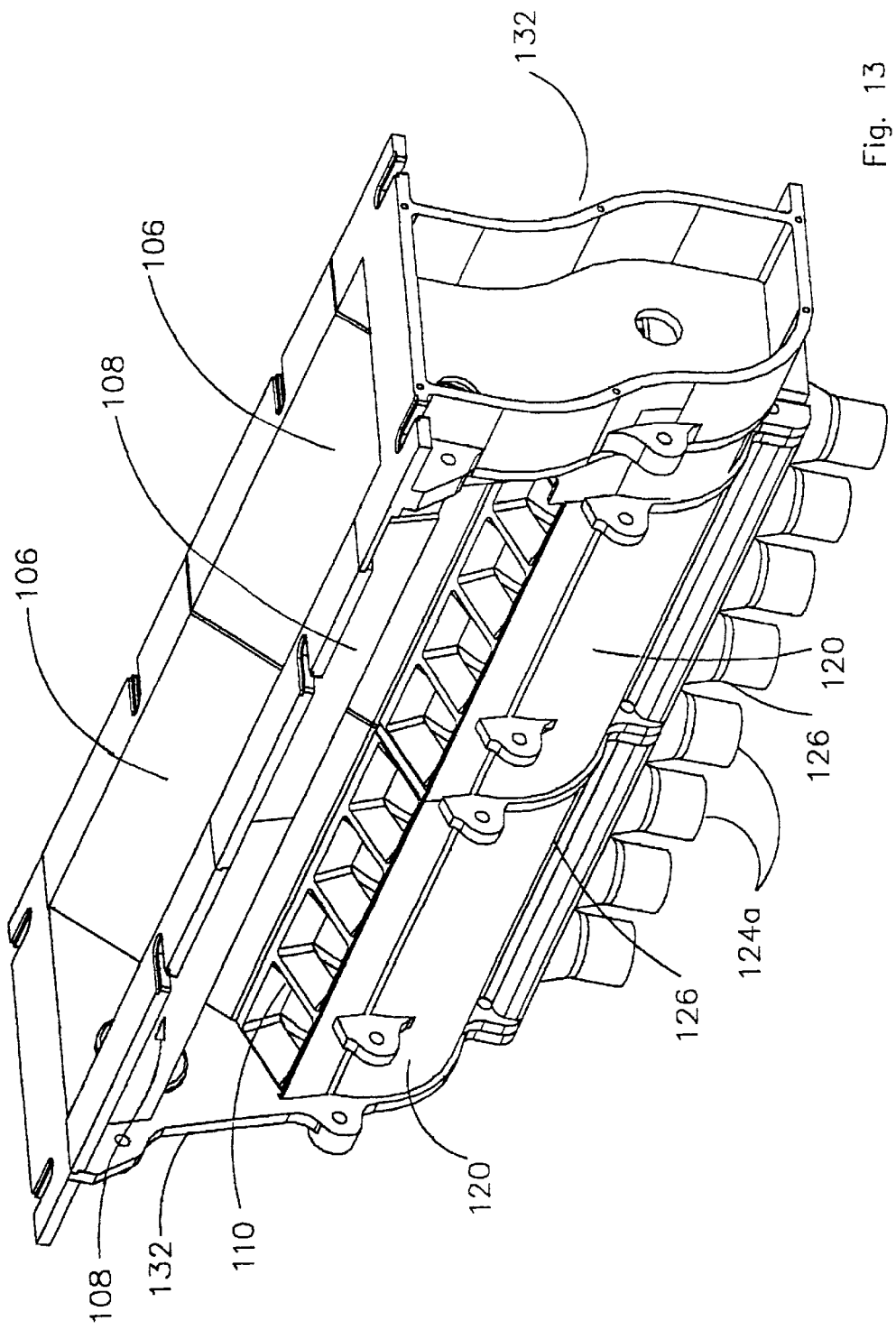
FIG. 13 is a perspective view of the seed metering device of FIG. 9 viewed from the opposite end.
Figure 14:
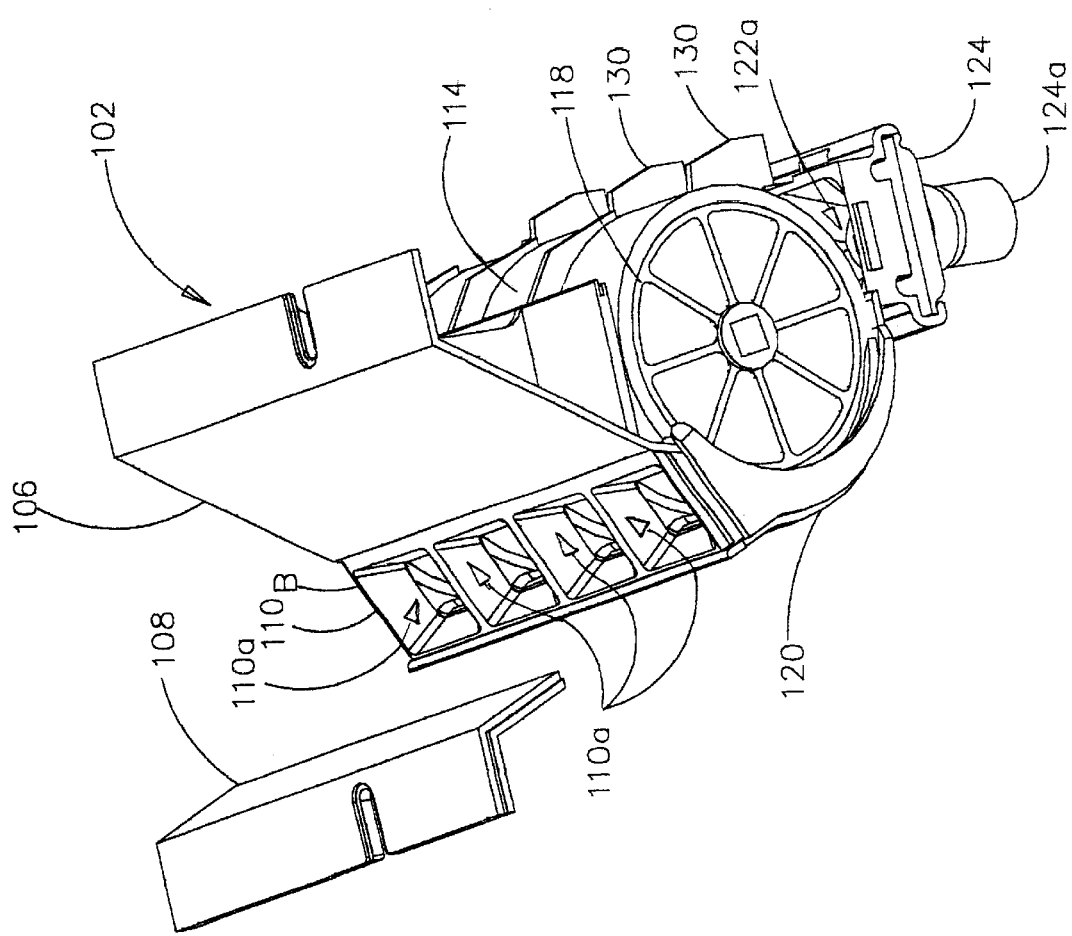
FIG. 14 is, in perspective view, a single seed metering module of the seed metering device of FIG. 9.
Figure 15:
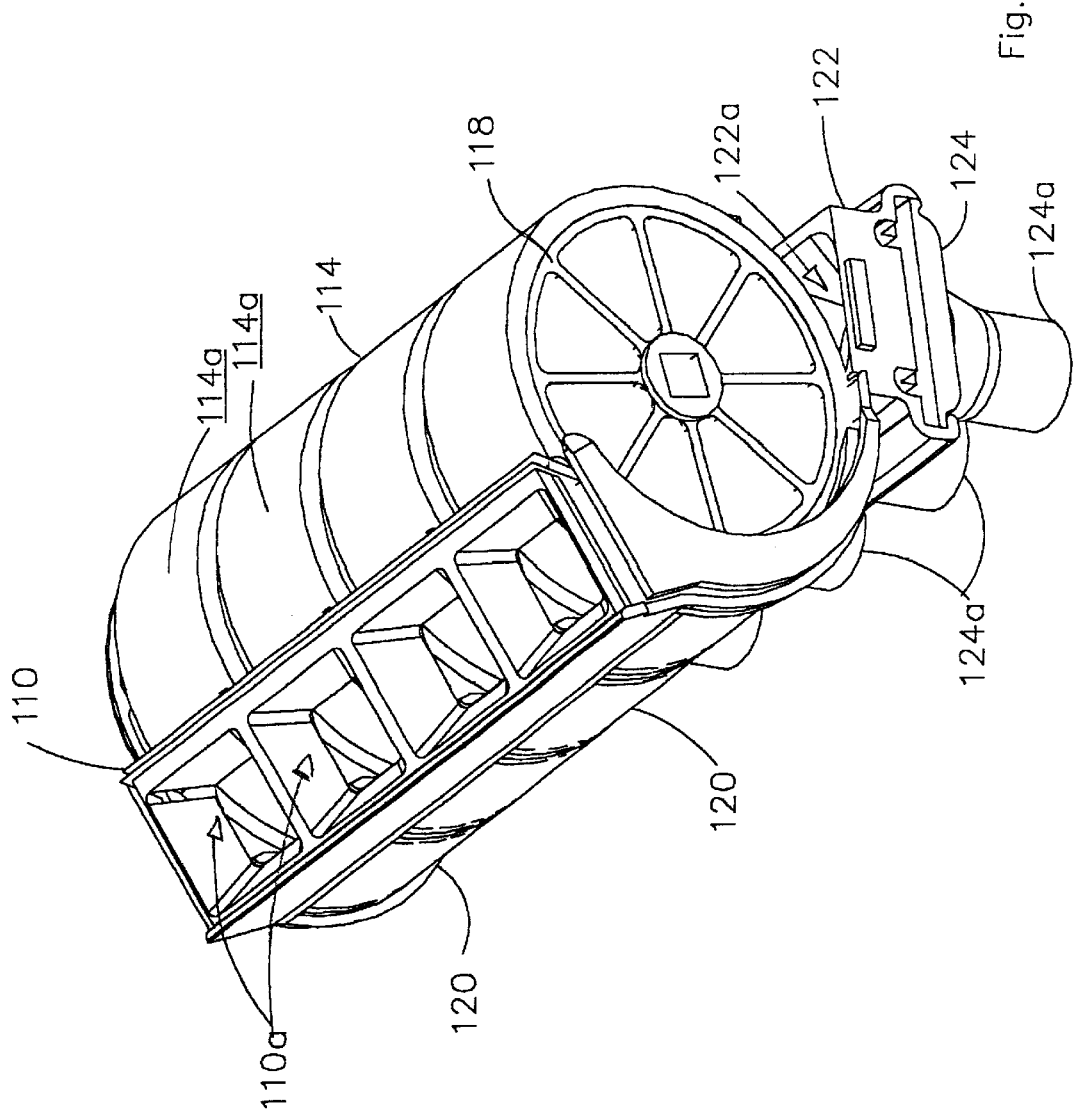
FIG. 15 is an enlarged partially cut away view of several rollers, the restrictor plate, the funnel and chute plates, and the curved wall of the roller housing with the side guard wall shown in dotted outline of the seed metering module of FIG. 14.
Figure 16:
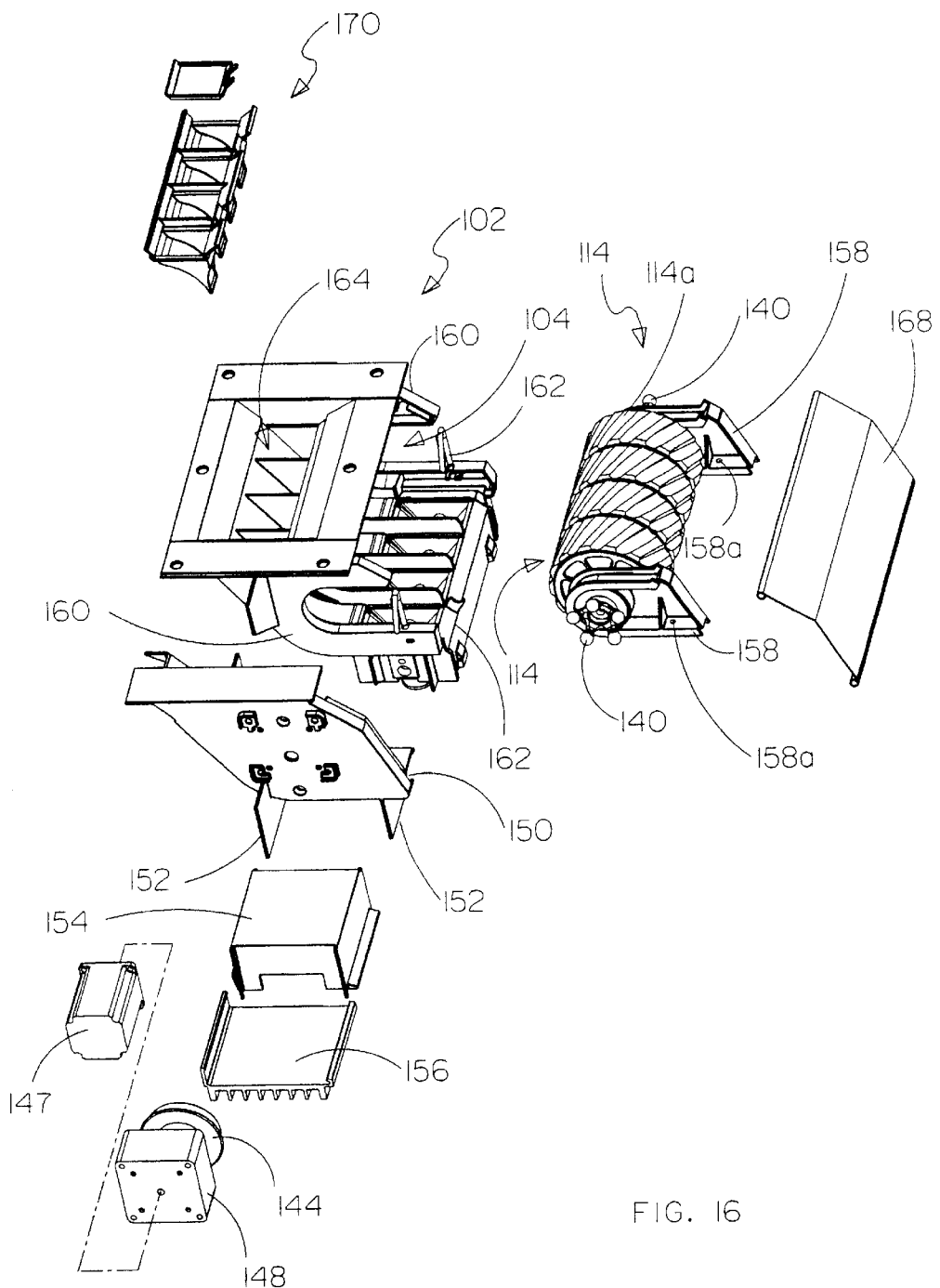
FIG. 16 is, in partially exploded perspective view, a single module of a further embodiment of the seed metering device according to the present invention.
Figure 17:
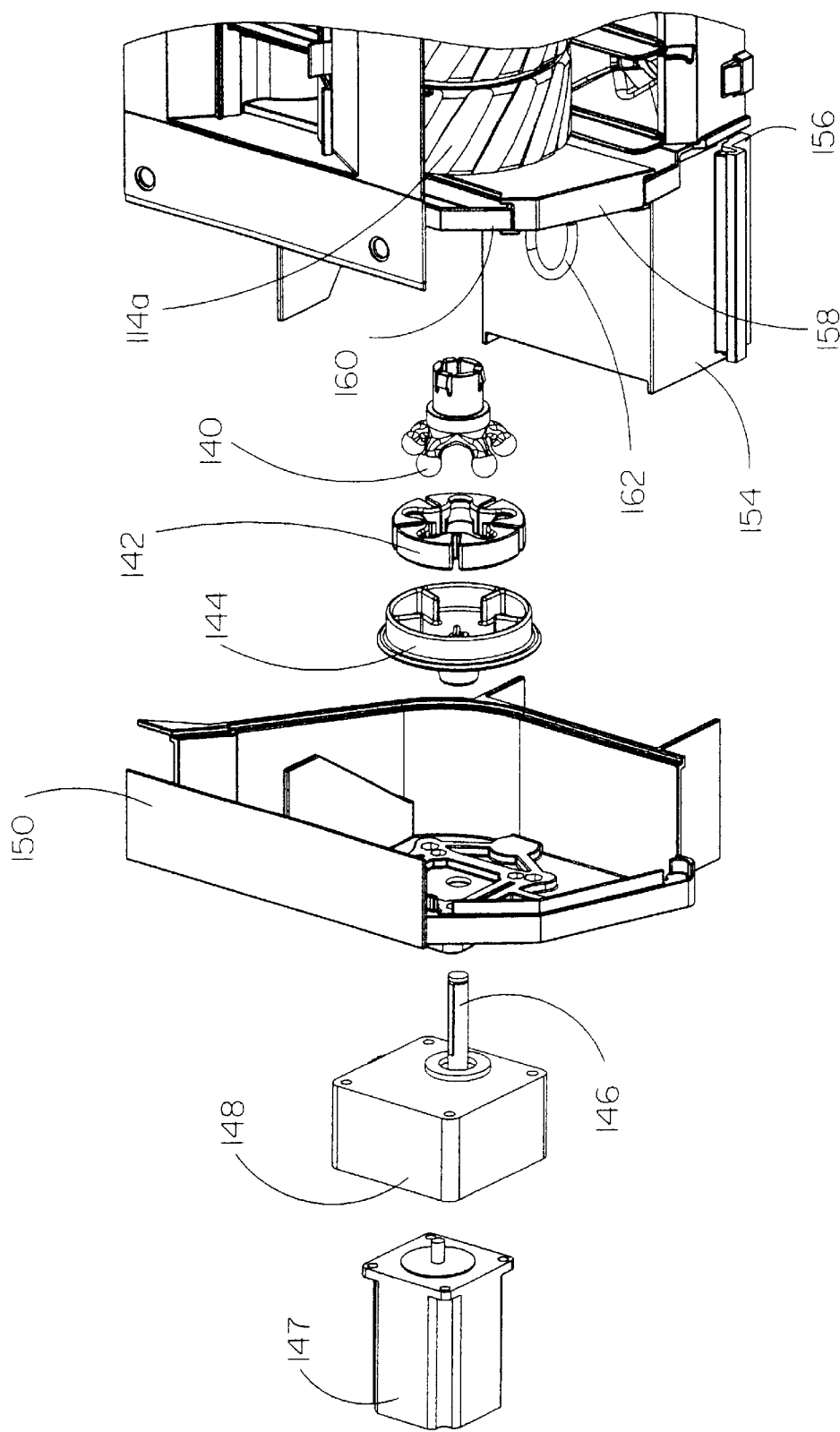
FIG. 17 is in, enlarged partially cut away and exploded view, the drive end of the seed metering device module of FIG. 16.
Figure 18A:
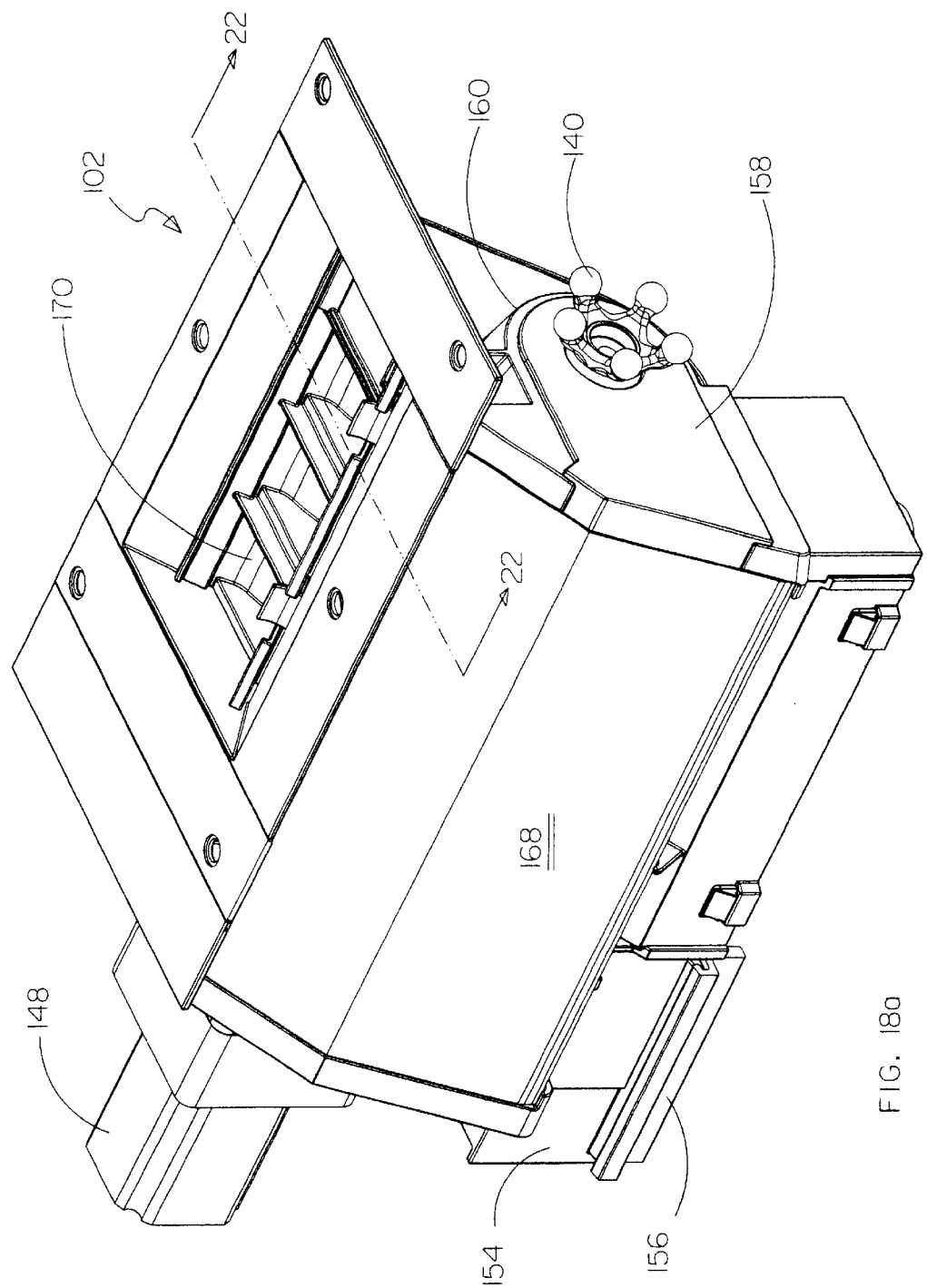
FIG. 18a is, in perspective view, the end opposite the drive end of the seed metering device module of FIG. 16.
Figure 18B:
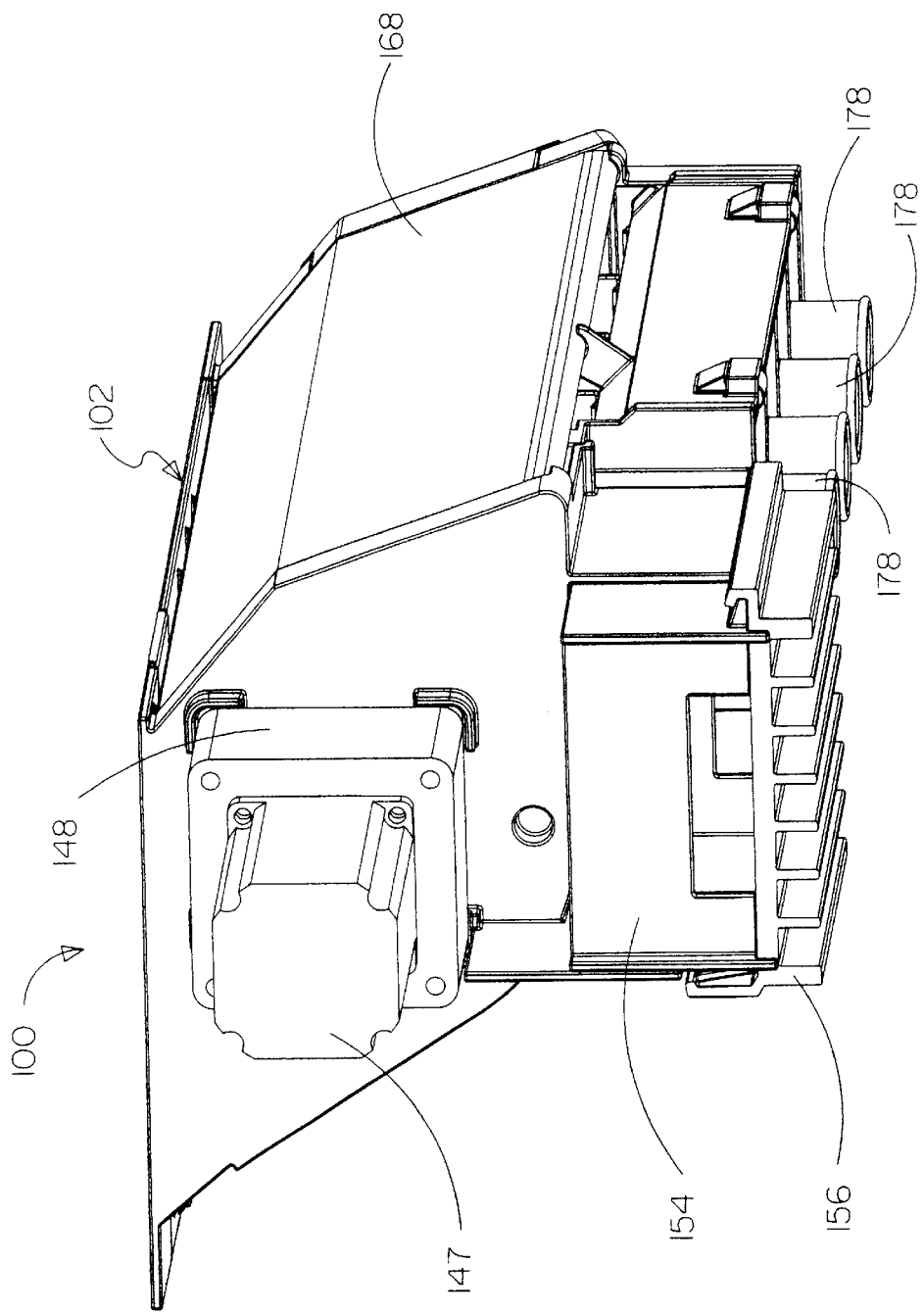
Figure 19:
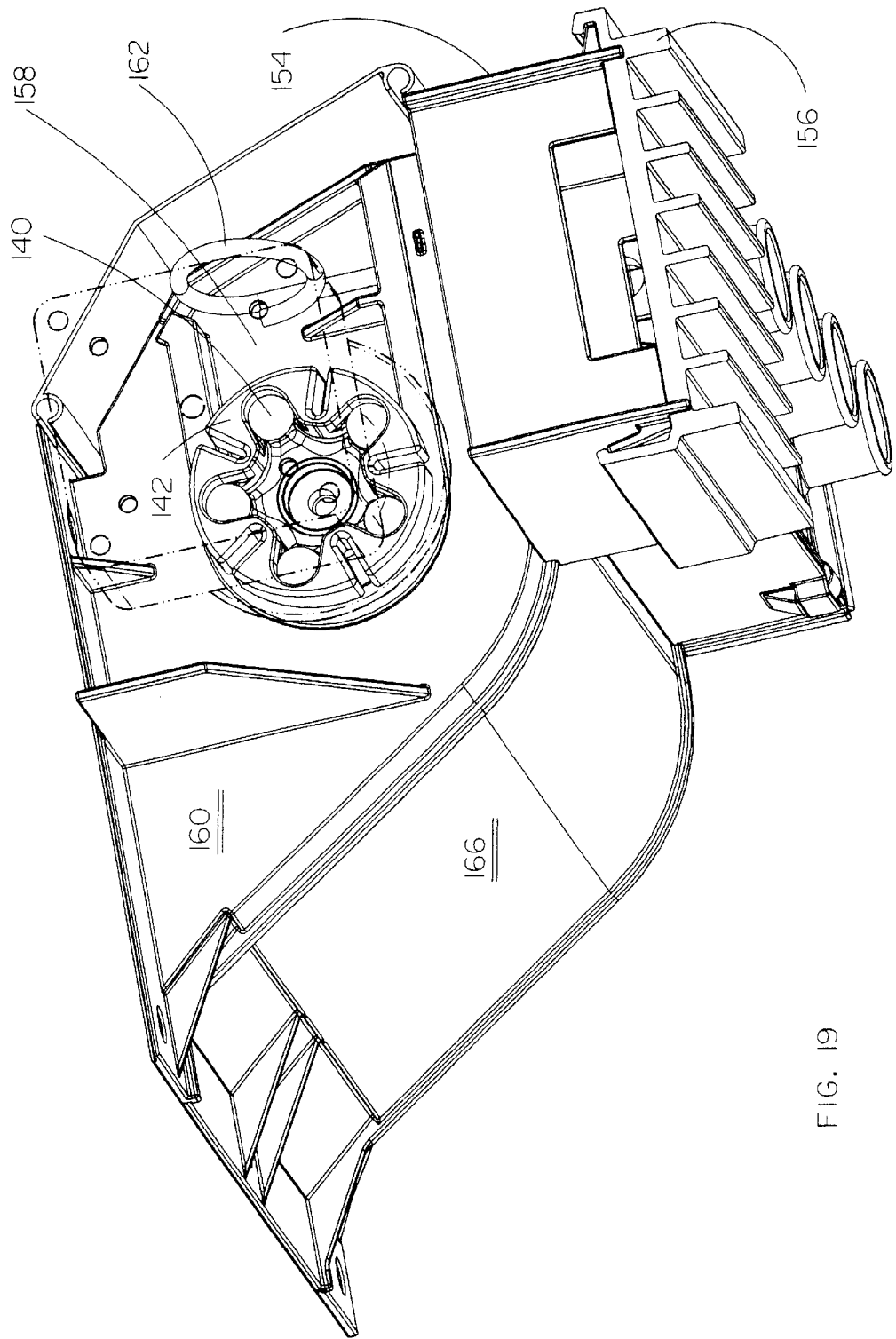
FIG. 19 is, in rear perspective view, the drive end of the seed metering device module of FIG. 16 with the gear housing shown in dotted outline and the drive motor removed.
Figure 20:
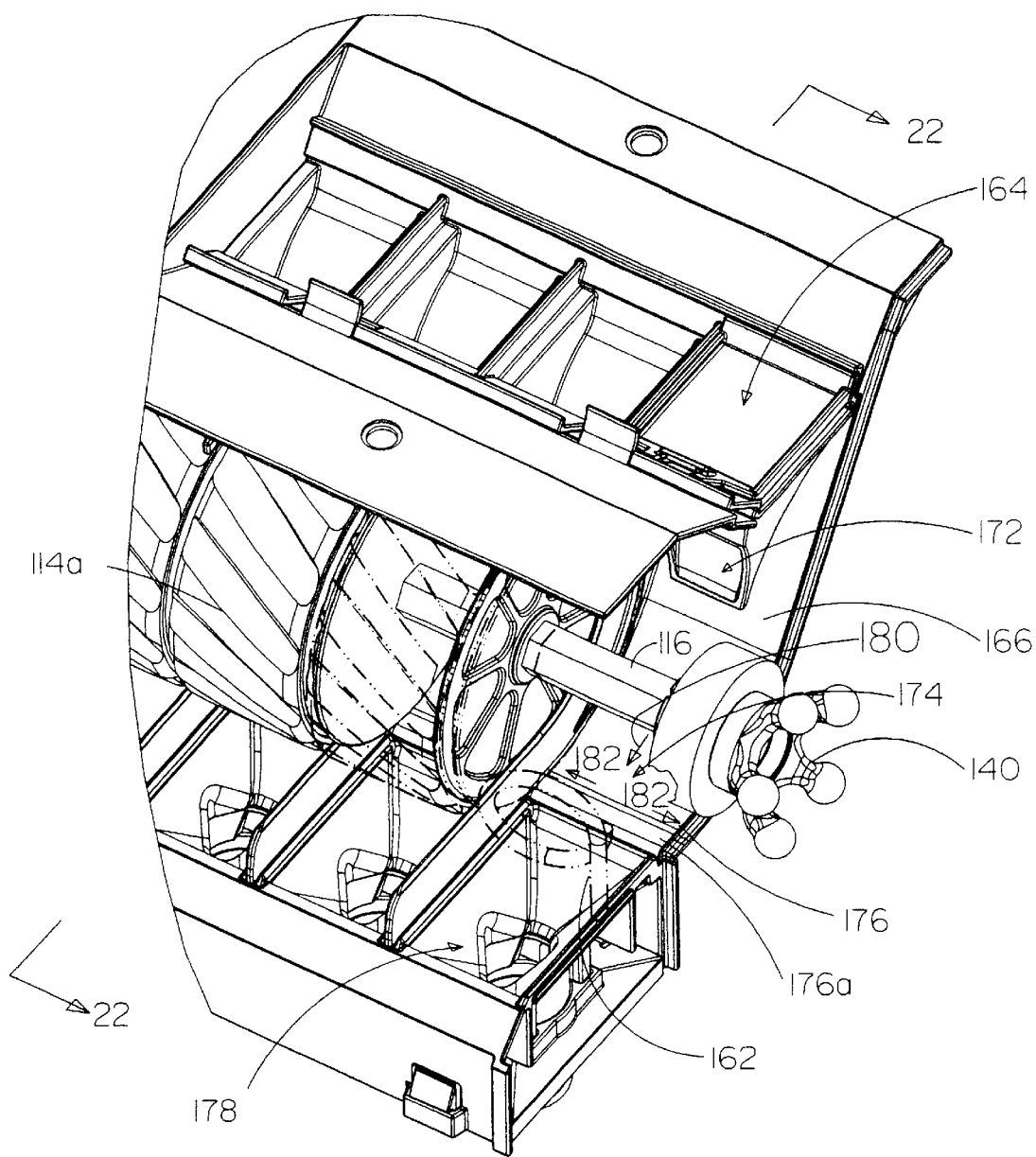
Figure 21:
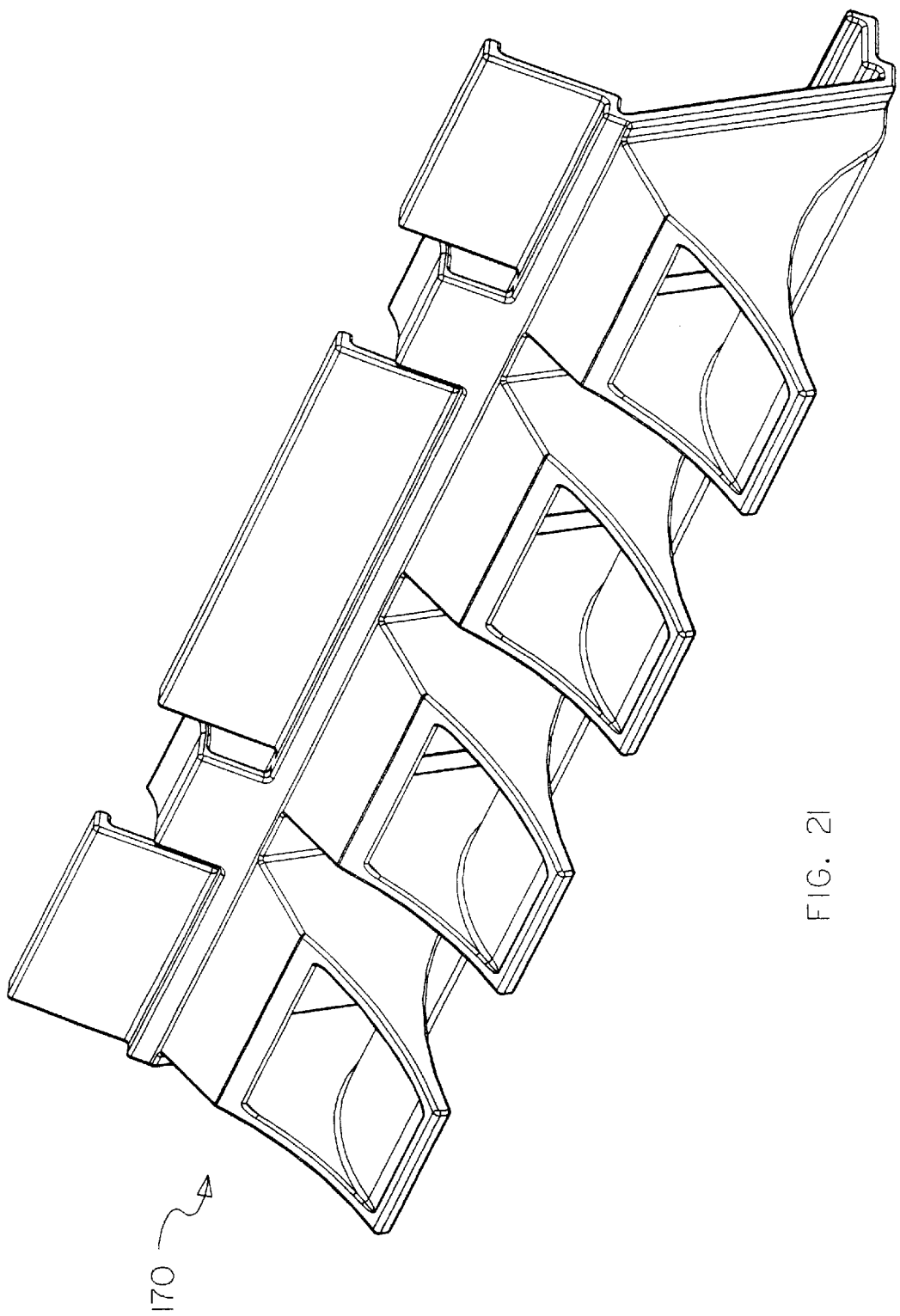

When flange 58a of aperture slide 58 is in its lowermost position so as to abut stop 60a, the aperture 58b in slide 58 as better seen in FIG. 7 aligns with the correspondingly sized aperture 16 in bin floor 14 so that the actual opening through which seeds 46 flow in direction B is at its maximum size for a maximum seed flow rate. As slide 58 is slid upwardly so as to translate flange 58a towards stop 60b, the lowermost edge 58c of aperture 58b is correspondingly translated across aperture 16 so as to reduce the size of the opening in the space between edge 58c, that is, the lower edge of aperture 58b, and the upper edge of aperture 16 in bin floor 14. Thus as seen in FIG. 1, edge 58c of slide 58 is being slid upwardly so as to shut off the opening immediately beneath aperture 16.

The ends of roller housing 18 are enclosed by opposite end walls 66. End walls 66 also have notches, similar to notches 28 in dividing walls 26, for passage therethrough of shaft 22. The notches in end walls 66 are however channeled so as to accept in mating engagement therein locking members 68. Resilient levers 68a urge raised lands 68b on arms 68a into releasable locking engagement in corresponding recesses within the channels 70 of end walls 66. Locking members 68 thus releasably lock shaft 22 into orthogonal alignment with dividing walls 26 so as to maintain roller surfaces 20a gently biased against lower curved faces 52 of nozzles 50. Upper wall 18b of roller housing 18 is notched so as to accommodate locking members 68, upper wall 18b being releasably mountable to end walls 66 for example by means of bolts or studs 72 engaging corresponding apertures 18c.

Cupped surfaces 68c on locking members 68 engage collars 74 mounted on shaft 22. Collars 74 may contain bearings or the like and also slidably mount into channels 70.

In an embodiment where a greater seed flow rate is desired, restrictor plate 48 is removed allowing seeds to fall into primary nip 56 directly. Primary nip 56 is a wedge-shaped elongate curved nip formed by the mounting of roller 20 in eccentric relation to a constant radius section of lower wall 18a of roller housing 18. The primary nip 56 extends in a curved gradually converging wedge over, in one embodiment, at least a 60 degree sector, that is, a radiused arc α along the inner surface of the lower wall of the roller housing between generally the position of the secondary nip 54 on the lower wall 18a and a generally vertically aligned position on the lower wall 18a, vertically aligned beneath the center of curvature 76 of the lower wall 18a, at the cusp where the roller surface 20a contacts the lower wall 18a of the roller housing. In one embodiment the lower surface of the vertex of the wedge-shaped nip is a short flat substantially horizontal section for example formed by the use of a spreader plate. The spreader plate has a downstream-most rolled rim-like lip providing a rounded edge as the exit surface downstream from vertex. In applicant's experience, the elongate curved seed flow trajectory of seeds 46 being drawn through primary nip 56 by rotation of roller 20, under the softly resilient urging of seeds 46 against lower wall 18a by the resilient roller, tends to sort the seeds into a single seed thickness layer 78 feeding into and through the vertex 56a of the wedge-shaped primary nip without bunching, jamming or double-stacking of seeds, i.e. being left as a double thickness seed layer 80 in the nip 56. The use of the downstream spreader plate may provide for a generally uniform "water-fall"-like dispersion of seeds across the width of the spreader plate so as to result in an even curtain of falling seeds being metered from the vertex of the primary nip.

The eccentric arrangement of roller 20 in relation to lower wall 18a may in one embodiment, and without intending to be limiting, be accomplished by offsetting by vertical distance "a" and by horizontal distance "b" the center of curvature 82 of roller 20 relative to center of curvature 76 of constant radius arc α. In particular, in the embodiment where the radius of curvature of roller 20 is 2 inches (4.4. cm.), that is, the roller has a 4 inch diameter, and the radius of curvature of arc α is 2.5 inches (5.5 cm.), distances "a" and "b" are approximately ¼ inch (0.55 cm.). This results in primary nip 56 equal to or exceeding approximately 3 inches (6.6 cm.) in length between upper nip 54 and vertex 56a of primary nip 56. Compared to nips in the prior art, this relatively long primary nip is well adapted for using soft foam rollers to meter a backed-up reservoir of seeds 46, such as in double thickness layer 80, in the upper end of the nip into single thickness layer 78 at the cusp or spreader plate before the outfall into chutes 57. The long nip provides an increased dwell time of the seeds in the gentle compression between roller 20 and lower wall 18a. The relative longer dwell time in the nip assists in the uniform settling of the seeds into the single thickness layer which provides uniform metering. A similarly shaped nip is also present on restrictor plate 48 although generally not as long as the length of the primary nip. In the event that a bunching or jamming of the seeds does occur which does not flatten or settle out, or that a larger seed or foreign object such as a stone enters nip 56, rollers 20 may compress due to their foam core to allow the bunched seeds or foreign object to pass through the nip without breaking of wall 18a which may occur with a non-fully-resilient roller trying to pass a large foreign object through the nip.

In the event that some of seeds 46 migrate out of the desired path, for example get wedged between discs 24 and walls 26, rotation of the rollers draws the errant seeds around in direction A so as to automatically eject them when they pass into the notches 28 in the walls so as to fall into chutes 57.

As seen in FIGS. 9–15, in an alternative embodiment of the present invention, seed metering device 100 is modular, having individual modules 102. Without intending to be limiting, each module may have four roller bays 104. Infeed guides are formed by converging sheeted members 106 and members 108 so as to direct a flow of seeds under a gravity feed from a hopper into modular, four-hole restrictor plates 110. As with restrictor plates 48, restrictor plates 110, when installed, have lower curved faces 112 which are generally flush with correspondingly aligned outermost surfaces 114a of rollers 114 when mounted on shaft 116. Again, seeds flowing from a hopper flow in direction B through the nozzles 110a into the upper nip formed between outer surfaces 114a of rollers 114 and the lower opening of nozzles 110a in lower curved faces 112.

Rollers 114 are cylindrical, being made of resilient material, for example, the foam of rollers 20 mounted between a pair of discs or on hubs 118. Shaft 116 mates through the discs or hubs, for example by the use of a rectangular or splined shaft mating with correspondingly sized and shaped apertures through the discs or hubs along their axes of symmetry so that rotation of the shaft also rotates the rollers.

Figure 22:
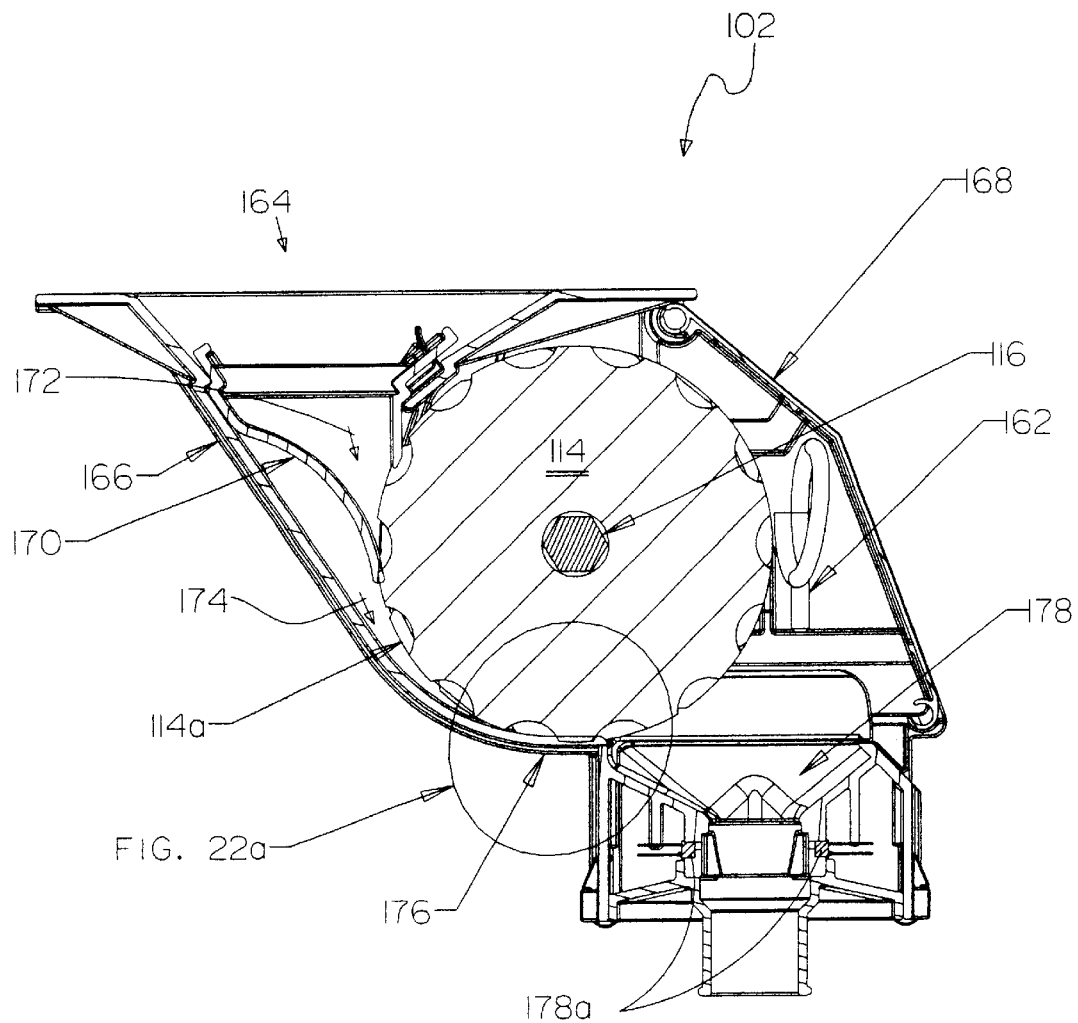
FIG. 22 is a sectional view along line 22—22 in FIG. 18a showing the use of a smooth sided roller.
Figure 22A:
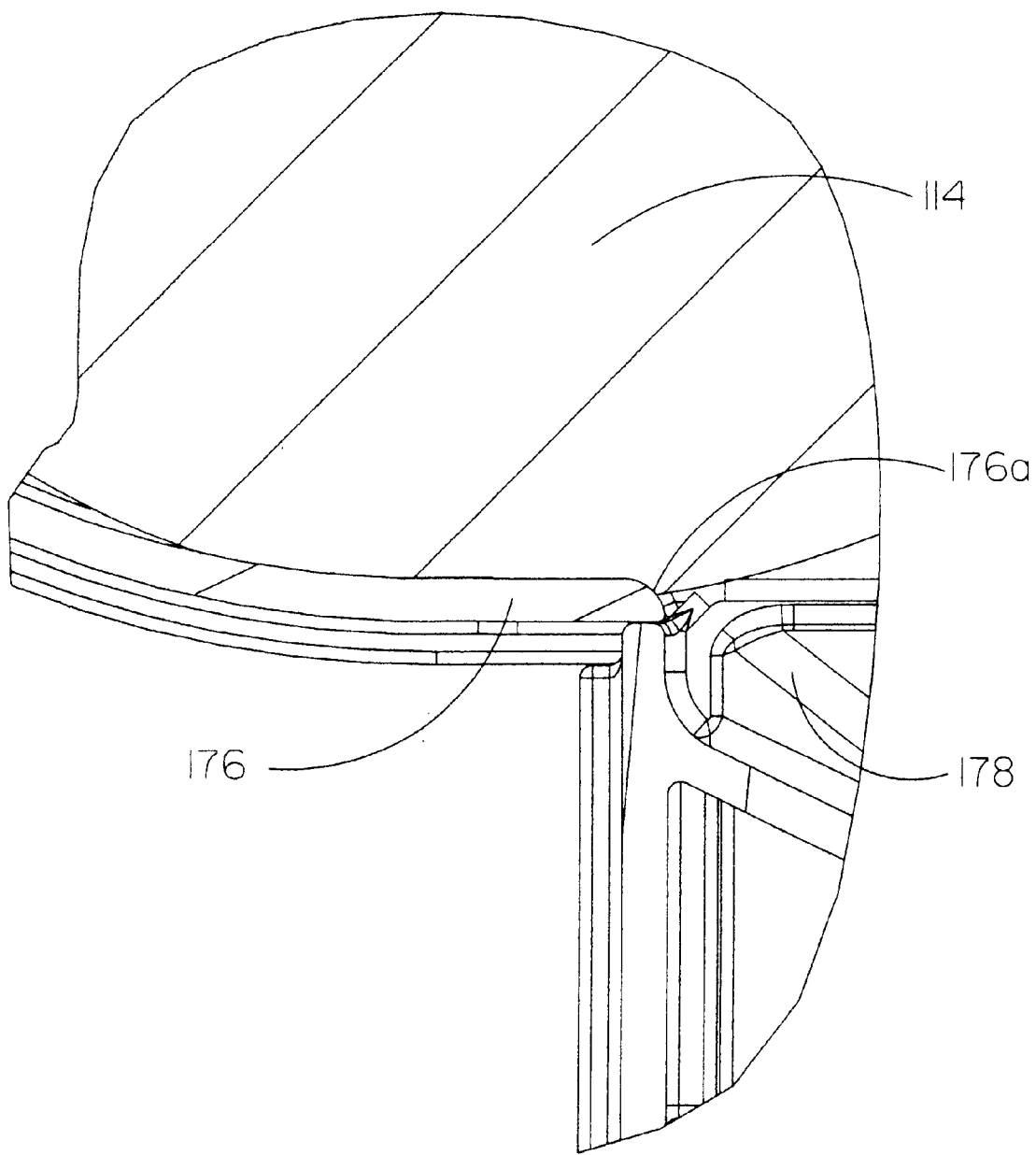
FIG. 22a is an enlarged partially cut away view of a portion of FIG. 22.
Figure 23:
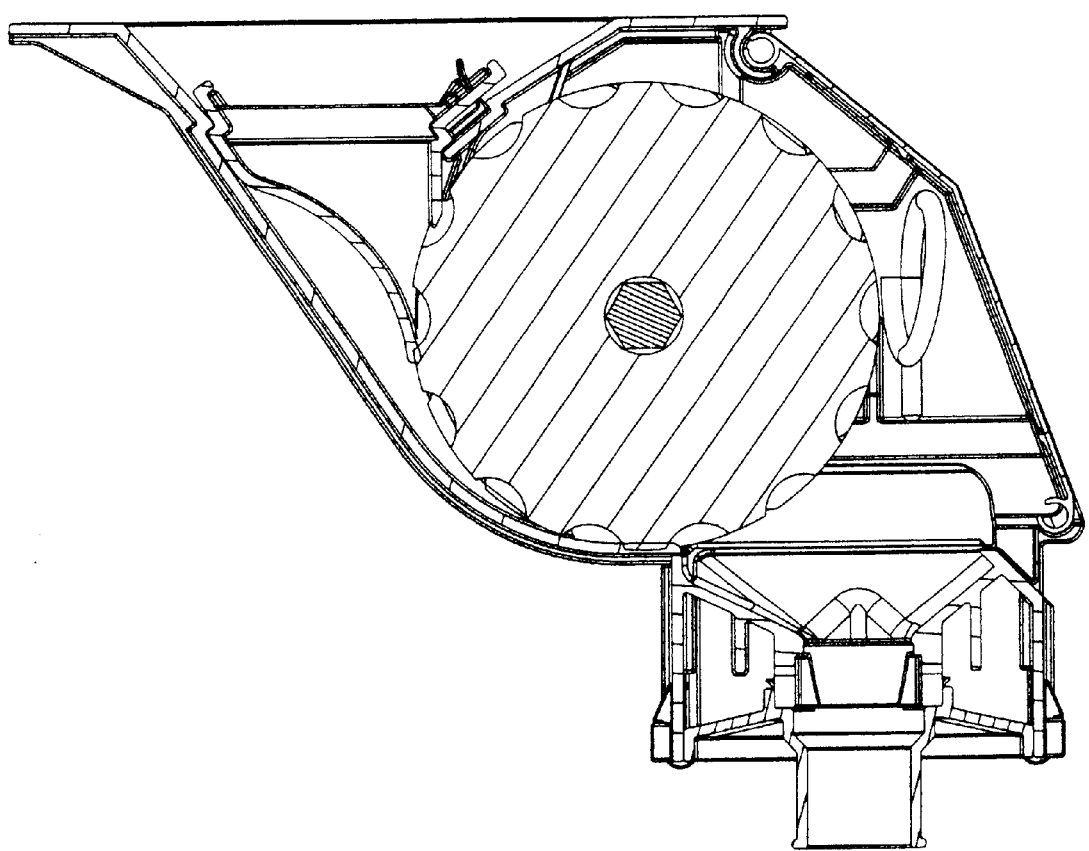
FIG. 23 is the view of FIG. 22 showing the use of a scalloped roller.
Figure 24:
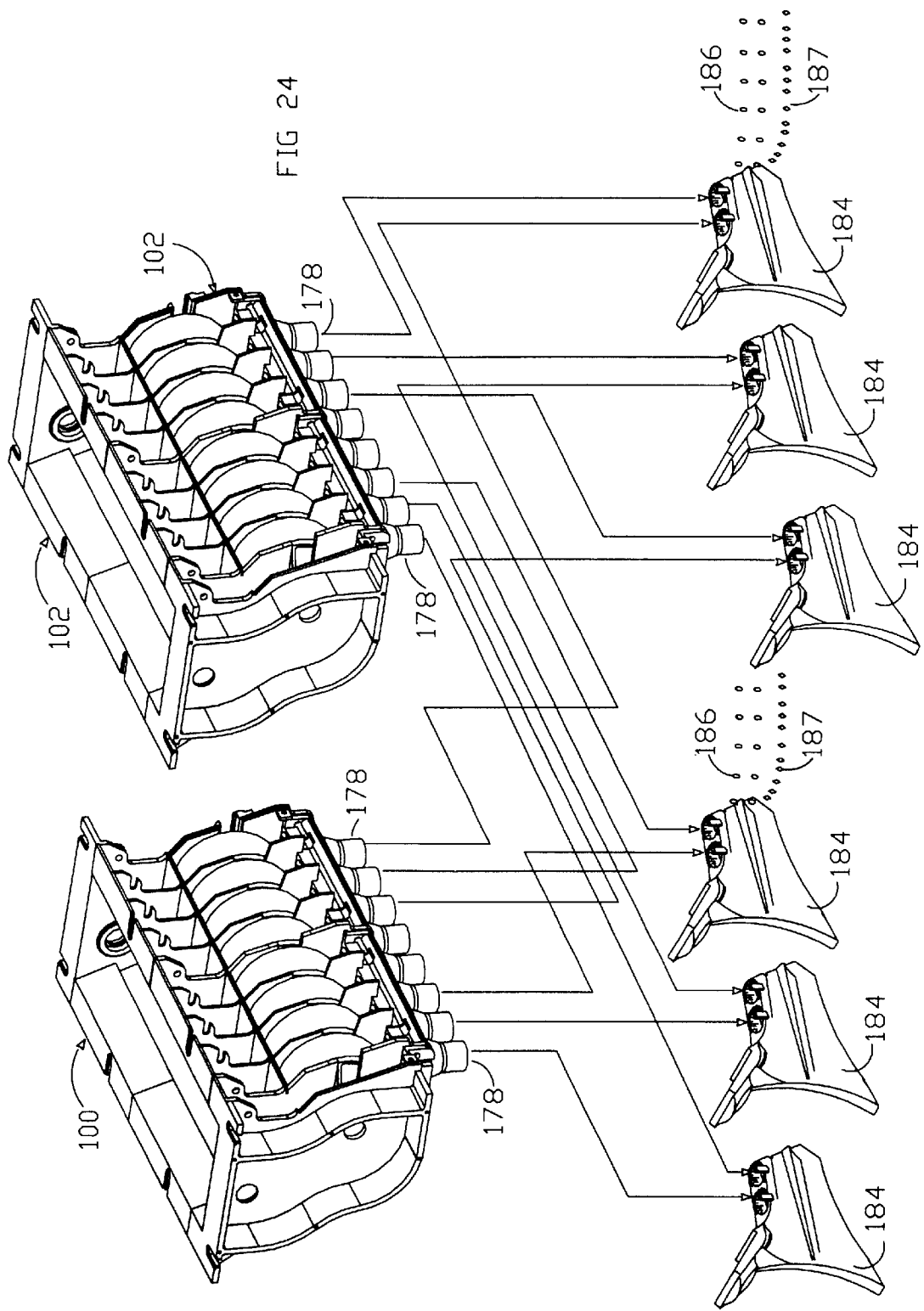
FIG. 24 is, in partially cut away perspective view, a diagrammatic illustration of individual chutes in fluid communication with corresponding opening blade conduits.
Figure 25:
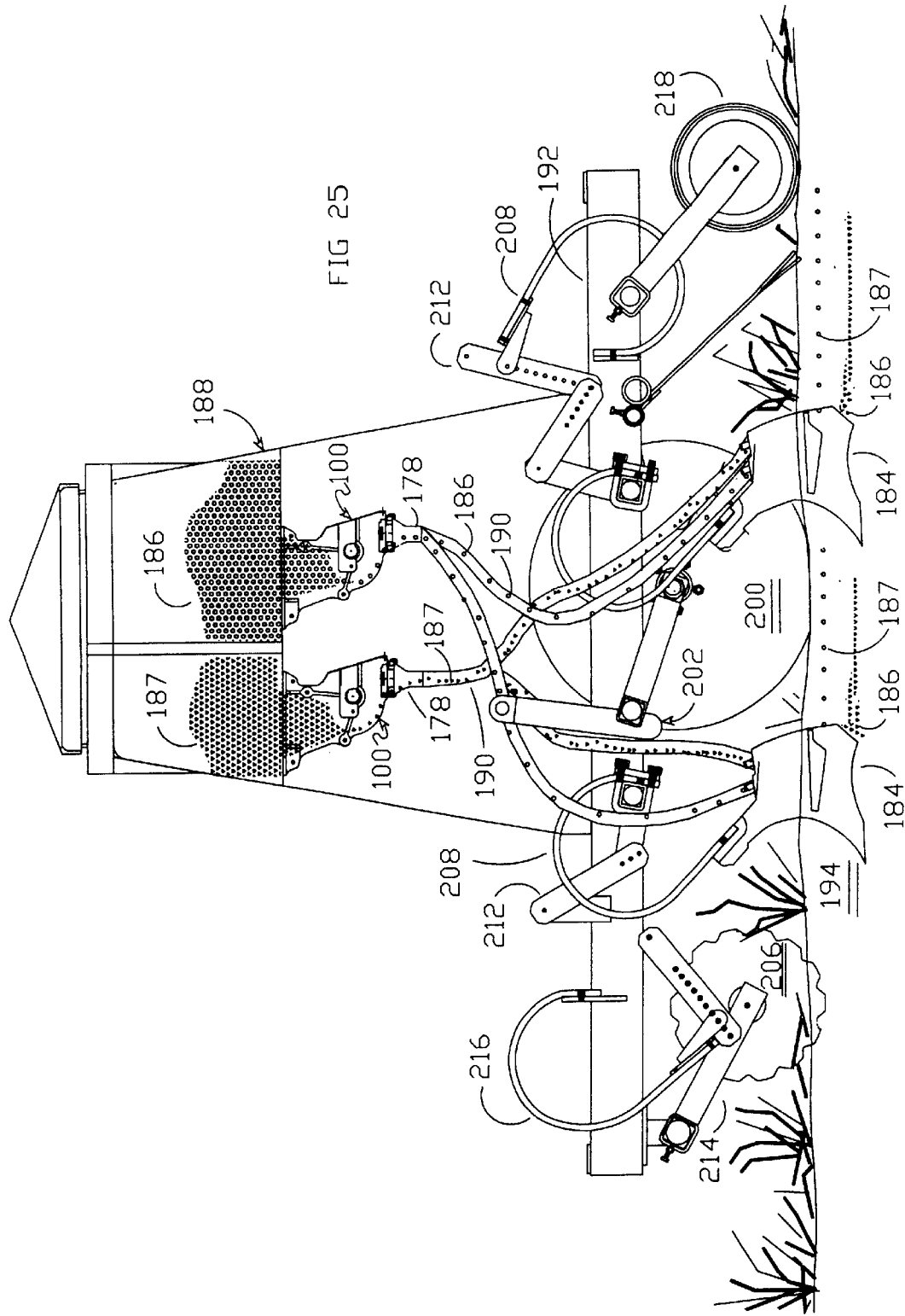
FIG. 25 is, in side elevation cross sectional view, seed metering devices according to the present invention mounted in cooperation between hoppers and opening blades mounted on a supporting frame.

Rollers 114 on shaft 116 are mounted relative to the curved wall 120 of each module 102 so as to form the primary and secondary nip arrangement described above. That is, the primary nip is a wedge-shaped elongate curved nip formed by the mounting of rollers 114 in eccentric relation to the constant radius curvature of curve wall 120 of the roller housing so as to provide the relatively longer dwell time in the nip assisting in uniform settling of the seeds into a single thickness layer. This provides for a uniform metering of the seeds. A similarly shaped nip is formed as the secondary nip between the roller surfaces and the lower curved faces of the restrictor plate nozzles 110a. Thus, in this embodiment, the relative geometries set out for the earlier embodiment are maintained so as to singulate seeds into a single thickness layer by the time the seeds are translated to the cusp or vertex of the primary nip before the outfall of the seeds into funnels 122a of funnel plates 122, feeding chutes 124a of chute plates 124. Again, advantageously a flat spreader plate having a rounded lip such as better seen in FIG. 22a.is employed at the lower, downstream-most edge of the primary nip vertex. Walls 126 are mounted between each modular four bay roller housing 128, each four bay roller housing 128 having dividing walls 130 separating the individual roller bays 104. End walls 132 are at opposite ends of the modularly assembled modules 102. It is understood that, although only two modules 102 are shown assembled between end walls 132, for example four or five modules 102 might be incorporated so that the rollers 114 of each module 102 are rotated by a common shaft 116. Although this is not intended to be limiting, it is applicant's experience that above such numbers of modules, shaft 116 may start deflecting, bending or otherwise distorting due to the force required to rotatably drive the rollers in frictional engagement against the seeds in the primary and secondary nips, or there may be other restrictions physically limiting the number of modules which may be driven by a common shaft.

The use of a stepper motor driving shaft 116 has been found advantageous. For example, applicant has used a stepper motor, model no. 4T5618L0304, made by Teco™ of Taiwan and distributed by Telco Intercontinental Corp.™ of Houston, Tex., USA. The relative precision of step rotation of rollers 114 by the use of a stepper motor and its associated gear box, such as described below, provides for improved accurate dispensing of seeds in unison between multiple hoppers, where the seed metering dispensers of the present invention are mounted beneath each hopper. In a preferred embodiment, a single stepper motor controller is employed per seed/bin type, this allowing for single in-cab control by a user. Equipment down time and associated loss of productivity is reduced by the use of modules 102 in that they are relatively easily removed and replaced.

In the further embodiment illustrated in FIGS. 16–28 the above described drive linkages are replaced by the use of a spur gear 140 mounted to at least one end of shaft 116. Spur gear 140 releasably mates into a corresponding female coupler 142. Female coupler 142 is mounted within its annular housing 144. Housing 144 is rigidly mounted to drive shaft 146 extending from reduction gear housing 148. Housing 148 contains reduction gearing to provide a 40:1 reduction gear ratio. In this embodiment, drive shaft 146 may extend through an aperture in a access panel or end cover 150. Cover 150 has a pair of downwardly extending flanges 152 which fit over circuit board housing 154 which contains the circuit boards for the stepper motor 147 driving the reduction gearing. Heat sink 156 mounts underneath circuit board housing 154.

A four-bay module containing four side-by-side rollers 114, for example those illustrated having diagonal scalloping on the roller surfaces 114a, are mounted as a single module onto drive shaft 116. If only a single module 102 is to be employed, then the drive shaft 116 will be only sufficiently long to mount the four rollers 114 onto the drive shaft. The first end of the drift shaft has, as described, a first spur gear 140 mounted thereon for mating with female coupler 142. The opposite or second end of the drive shaft may also have a second spur gear 140 mounted thereon in oppositely disposed relation to the first spur gear 140. This second spur gear 140 may merely provide a handle for assisting an operator installing the roller module so that, for example, an operator may manually rotate the rollers and the first spur gear 140 so as to mate the first spur gear into female coupler while installing the module of rollers. In this embodiment, the module of rollers are mounted on drive shaft 116 between a pair of end plates 158. End plates 158 slide into corresponding C-shaped end walls 160 of module 102 so as to seat the rollers into their corresponding bays and so as to align pin holes 158a with corresponding apertures in the lower arm of C-shaped end walls 160. When so aligned, end plates 158 may be releasably locked into place by inserting pins 162 through pin holes 158a and the corresponding apertures in end walls 160.

As in the above described embodiments, seeds are fed from hoppers into the individual roller bays 104 through an upper aperture 164 in module 102. Again, a lower wall 166 provides a rigid control surface forming an elongated wedge-shaped primary nip between the control surface and roller surfaces 114a. The opening into the roller bays is closed by cover 168. As before, a flow restrictor plate 170 may be mounted into aperture 164 so as to provide the secondary nip upstream of the primary nip. Thus seeds flowing downwardly from a hopper through aperture 164 flow through flow restrictor 170 and are metered initially by the rotation of rollers 114 through the secondary nip 172 and then further metered as the rollers rotate, drawing the seeds through the primary nip 174. Seeds being drawn through primary nip 174 pass over a downstream-most surface or spreader plate 176. Advantageously, as described above, spreader plate 176 has a substantially horizontal flat or planar surface uniformly disposed across the downstream-most lower portion of the control surface of lower wall 166 at the downstream-most end of the primary nip. It has been applicant's observation that horizontally flattening out the downstream-most portion of the rigid control surface in the primary nip causes the seeds in the primary nip to be not only metered in a uniform flow into chutes 178 in direction 180 but also to be laterally spread across the width of the roller bay in lateral directions 182 so as to provide a laterally spread uniformly metered flow of seeds cascading from the primary nip 174 over the rounded downstream-most edge or nose 176a of spreader plate 176.

The embodiment of FIGS. 16–28 differs from the embodiment of FIG. 1 in a further aspect in that the agitator shaft 42 is not driven by drive sprockets from a drive gear off shaft 146, but rather, the agitator shaft is, for example, chain driven from a different power takeoff not involving the stepper motor 147. In this matter, all of the power available from stepper motor 147 may be used for precise stepped rotation, more particularly for stepped angular repositioning of the rollers in their bays, rather than diverting some of the power of stepper motor to turning the agitator shaft where precise control of rotation of the agitator shaft is not called for.

Although in this latter embodiment, a stepper motor is described, it is not meant to be limiting as the seed metering device of the present invention may, with less accuracy, be ground driven (see for example ground-engaging wheel 198 in FIG. 28 described below) as a supporting frame is translated over the ground being seeded, electrically driven, hydraulically driven, or most primitively, hand actuated, or a combination of these. However, applicant has found it most advantageous to employ a stepper motor for a number of reasons.

At present, a relatively inexpensive stepper motor such as the above-mentioned model no. 4T5618L0304 manufactured by Teco™ provides for a relatively inexpensive mechanism for the precise angular repositioning of roller wheels 114 about shaft 116. For example, the identified Teco stepper motor angularly steps the roller wheels in 1.8 degree increments per step. The stepper motors have the further benefit that they do not require feedback in order to monitor their rotation rate unlike DC Servo Motors. Thus it has been found that the identified Teco stepper motor may have a realistic limit of rotating eighteen rollers on a single shaft 116 by a single stepper motor. At present, applicant's design is constrained by a gravity feed limit of approximately four feet for the tubing feeding from chutes 178 into opening blades 184. Opening blades 184 deliver seeds, and fertilizer or water (depending on the type of blade) through internal conduits having apertures adjacent the bottom of the blades. The ground opening blades may be the two-conduit models illustrated herein or for example three conduit models such as those disclosed in U.S. Pat. No. 6,182,587 and incorporated herein by reference. Such opener blades 184 are depicted cooperating with the metering devices of the present invention in FIGS. 24–28 although this is not intended to be limiting. As better seen in FIG. 25, hoppers 188 feed seed or fertilizer or other granular material 186 and 187 into metering modules 102 which feed the material from each chute 178 through flexible tubing 190 so as to feed individual opening blades 184. Applicant at present is constrained by an approximately four foot gravity feed limit through tubes 190 which thereby limits the width of the control band controlled by a single seed metering device to a band approximately four feet wide. At present, applicant's designs incorporate up to eight opening blades 184 per four foot control band.

Flow detectors 178a are mounted in chutes 178. The flow detectors alert the operator when the flow of granular material ceases. This includes both lack of flow from the hopper and full, i.e. blocked and backed-up, discharge tube conditions caused by blockages downstream of the metering unit. Each flow detector may include an infrared (LED) emitter/photo detector pair mounted in each individual chute 178, and their associated logic control circuitry. The emitter/detector pairs detect transitions in light level caused by material flow passing through the detection area, for example the chute throat. The associated control electronics first conditions the signal from the photo detectors then uses it to detect a fail condition. If such a condition is detected a latch is set and the fail alert signal is passed to the main unit electronics module. This module indicates the location of the metering unit that is malfunctioning and passes the alarm signal to the operator control unit in the cab of the tractor. Multiple failures will result in all failed units indicating at the main electronics module, for example by manually clearing the blockage, after correcting the problem, the operator simply starts operation and presses the reset button to resume normal operation.

A laterally adjacent array of hoppers 188 and corresponding seed metering devices 100, each incorporating modules 102, are mounted on a supporting frame 192 which may be then translated over the soil 194 to be seeded for example behind a tractor or oxen (not shown) or the like pulling towing linkage such as tow bar 196. Thus with the use of stepper motors 147 for each seed metering device 100, while the lateral array is being translated in a straight line, a uniform seed density is deposited from the opening blades 184 by sending a common actuating pulse to each of the stepper motors 147. Thus a common master step source may be employed for straight line seeding. However, during a turn, it will be appreciated that the lateral array, if merely relying on a common master step source for all of the stepper motors, will result in a higher seeding density to the inside of the turn where the ground speed is reduced, and a lower seeding density to the outside of the turn where a higher ground speed results proportional to the turn radius. As it is however one object of the present invention to provide for uniform seeding density across the length of the lateral array of seeding devices and their corresponding opening blades, by the use of stepper motors, for example one for each four foot wide control band. This allows for proportioning the signal to individual stepper motors so as to approximate uniform seeding density across the array throughout the turn. That is, the stepper motors radially innermost in the turn will have their step rate proportionally reduced, and the stepper motors radially outermost in the turn will have their step rate proportionally increased so as to approximate the seeding density of the seed metering device midway between the radially inner and outer ends of the lateral array. Where, as in the present embodiment, an encoder (such as might be employed in conjunction with ground engaging wheel 198) is provided to read true ground speed, the processor governing the stepper motors may be programmed so as to shut off or shut down the seed metering devices when, for example the ground speed either exceeds eight miles per hour or falls below three quarters of a mile per hour. These tolerances may be exceeded in the radially outermost part of the turn or in the radially innermost part of the turn respectively and so the processor may shut down the corresponding seed metering devices for the corresponding stepper motors during the turn, or during straight line seeding should those tolerances be exceeded, again in an effort to maintain uniform seeding density.

Thus in use, an operator in for example the cab of a tractor, would set a cab control by, for example, dialing an indexed knob on a control panel. If for example the operator wanted to uniformly seed at a seed density of fifty bushels of seed per acre, the operator would set the control to approximately the correct setting, then would calibrate by actually measuring the seed output and adjusting the cab control accordingly. Once the correct cab control setting was determined, seeding would commence with the processor monitoring the true ground speed, for example for each frame-supporting wheel 200 so as to ensure that seeding occurs only within the operational velocity range (for example ¾–8 mph). Wheels 200 may be mounted on selectively actuable linkages 202 so as to be actuable by an actuator 204 between the elevated position of FIGS. 25 and 26 wherein the blades 184 and corresponding coulter wheels 206 are partially submerged for seeding and the lowered position of FIG. 27 wherein blades 184 and coulter wheels 206 are removed from contact with the soil. Thus as seen in FIGS. 26–28, each coulter wheel 206 in a laterally spaced array of coulter wheels 206 mounted across frame 192 are aligned in the direction of travel with corresponding opening blades 184 mounted to frame 192 by leaf springs 208 mounted on rotatable cross-members 210. Rotatable cross-members 210 may be rotated by linkages 212 relative to frame 192 to raise or change the angle of attack of blades 184 relative to the soil. Coulter wheels 206 may also be resiliently mounted to frame 192 by means of linkages 214 and leaf springs 216. Slot closing wheels 218 may be provided, mounted on frame 192, to press down on and close the slots formed in the soil by the passing of blades 184.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A seed metering device comprising:

an upper member for mounting beneath a reservoir for holding granular material, said upper member having an aperture cooperating in fluid communication with said reservoir, first and second opposed facing nip forming surfaces mounted beneath said aperture so as to form a primary nip below said aperture so that granular material falls through said aperture into said primary nip, wherein said first nip forming surface is a radially-outer surface of a resilient cylindrical roller and said second nip forming surface is a rigid curved control surface on a lower wall mounted beneath said upper member and adjacent said roller, said roller rotatable about an axis of rotation by a roller drive driven by driving means in a first rotational direction so as to draw the granular material down through said primary nip, by frictional engagement of the granular material in said nip with said surface of said resilient roller, said control surface having a center of curvature offset from said axis of rotation of said roller so that said control surface and said roller are eccentric and said primary nip is elongate, curved and wedge-shaped, a vertex of said wedge-shape of said primary nip being at a lower end of said control surface beneath said roller, said vertex including at a lower, downstream-most end, a substantially horizontal flat spreader surface, extending as a uniformly flat surface substantially horizontally in said first rotational direction and across the width of said vertex so as to laterally spread granular material in said primary nip across said width of said vertex as said roller is rotated in said first rotational direction to thereby provide a laterally spread uniformly metered flow of the granular material cascading from said vertex, said seeds following a pathway from said first aperture, into a wide upper opening of said primary nip and into compressed engagement between said roller and said control surface so as to resiliently deform said roller as said roller resiliently urges said seeds into a single thickness layer as said primary nip converges to said vertex and the granular material is drawn through said primary nip so as to emerge downstream of said vertex for dropping into an outfeed chute.

2. The device of claim 1 wherein said roller has a resilient core and said downstream-most end of said control surface is a spreader plate having said spreader surface thereon.

3. The device of claim 2 wherein said roller is made of polyurethane foam.

4. The device of claim 3 wherein said polyurethane foam is 40 pound polyurethane foam.

5. The device of claim 1 wherein said second nip forming surface includes a rigid flow restrictor.

6. The device of claim 5 wherein said flow restrictor is a rigid nozzle surface of a nozzle mounted beneath said aperture.

7. The device of claim 6 wherein said rigid nozzle surface is a lower surface of a converging nozzle conduit extending through said nozzle.

8. The device of claim 7 wherein said nozzle has a curved lower surface flush with said surface of said roller, said nozzle conduit terminating in an aperture in said curved lower surface so as to form a secondary nip between said nozzle surface and said surface of said roller.

9. The device of claim 1 wherein said roller is mounted on a drive shaft of said roller drive, a pair of rigid discs mounted one on each opposite side of said roller so as to sandwich said roller between said pair of rigid discs leaving said radially-outer surface of said roller exposed for rotation through said primary nip.

10. The device of claim 9 wherein said pair of rigid discs are rigidly mounted on said drive shaft and snugly sandwich said roller mounted in adhesive engagement therebetween so that rotation of said pair of rigid discs on said drive shaft simultaneously rotates said roller.

11. The device of claim 9 wherein a pair of rigid walls are mounted below said floor, generally orthogonal thereto, said pair of walls having apertures therein, said drive shaft journalled through said apertures in said pair of walls, said pair of walls sandwiching therebetween said pair of rigid discs and said roller.

12. The device of claim 11 wherein each wall of said pair of walls has arcuate disc supports formed therein for sliding rotational mating of said pair of rigid discs into said disc supports.

13. The device of claim 1 wherein said roller is a parallel array of rollers, said array extending the length of said first aperture.

14. The device of claim 13 further comprising a roller housing, wherein said roller housing has a shaft rotatably mounted in opposite end walls of said housing, said housing enclosing said array of rollers when said array of rollers are mounted on said shaft for simultaneous rotation of said array of rollers by said shaft, and wherein said lower wall is formed as part of said roller housing.

15. The device of claim 14 wherein said roller housing is a modular array of roller housings each array having rotatably mounted therein a corresponding said array of rollers, wherein all of the rollers of said arrays of rollers in said array of roller housings are mounted on a common said shaft.

16. The device of claim 15 wherein said shaft is driven by a gear linkage and a stepper motor, said motor driving said gear linkage, said gear linkage driving said shaft.

17. The device of claim 1 wherein said surface of said roller is notched.

18. The device of claim 1 wherein said center of curvature of said roller is offset downwardly from said center of curvature of said control surface.

19. The device of claim 1 wherein said center of curvature of said roller is offset outwardly from said center of curvature of said control surface and away from said control surface.

20. The device of claim 1 wherein said drive means is a stepper motor.

* * * * *